(12) United States Patent
Cook et al.

(10) Patent No.: US 8,161,908 B2
(45) Date of Patent: Apr. 24, 2012

(54) SELF-CLEANING LITTER BOX

(75) Inventors: Alan J. Cook, Chicago, IL (US); Kristin William Grube, Bloomington, IN (US); Thomas Edward Devlin, Sommerville, MA (US); Jeff Reed Greason, Portsmouth, NH (US); Karl Thatcher Ulrich, Narbeth, PA (US); Nathan Thatcher Ulrich, Lee, NH (US); Chi Lam Yau, Dover, NH (US)

(73) Assignee: Lucky Litter LLC, Chicago, IL (US)

( * ) Notice: Subject to any disclaimer, the term of this patent is extended or adjusted under 35 U.S.C. 154(b) by 0 days.

(21) Appl. No.: 12/786,264

(22) Filed: May 24, 2010

(65) Prior Publication Data

US 2010/0313818 A1 Dec. 16, 2010

Related U.S. Application Data

(62) Division of application No. 10/574,068, filed as application No. PCT/US2004/032408 on Sep. 30, 2004, now Pat. No. 7,762,213.

(60) Provisional application No. 60/507,416, filed on Sep. 30, 2003.

(51) Int. Cl.
*A01K 29/00* (2006.01)

(52) U.S. Cl. ......... 119/166; 119/161; 119/165; 229/169

(58) Field of Classification Search .................. 119/166, 119/161, 165; 229/169
See application file for complete search history.

(56) References Cited

U.S. PATENT DOCUMENTS

| | | | |
|---|---|---|---|
| 1,514,291 A | 11/1924 | Kimber | |
| 3,734,057 A | 5/1973 | Lee et al. | |
| 3,811,410 A | 5/1974 | Roberts | |
| 3,954,086 A | 5/1976 | Maness | |
| 4,011,836 A | 3/1977 | Temel et al. | |
| 4,011,837 A | 3/1977 | Ksioszk | |
| 4,067,297 A | 1/1978 | Johnson | |
| 4,096,827 A | 6/1978 | Cotter | |
| 4,098,229 A | 7/1978 | Haynes | |
| 4,117,804 A | 10/1978 | Moore et al. | |
| 4,120,264 A | 10/1978 | Carter | |
| 4,171,680 A | 10/1979 | Silver et al. | |
| 4,190,525 A | 2/1980 | Menzel | |
| 4,271,787 A | 6/1981 | Wellman et al. | |
| 4,284,273 A * | 8/1981 | Gansewig | ...................... 172/26 |
| 4,308,759 A | 1/1982 | Sobotta | |

(Continued)

FOREIGN PATENT DOCUMENTS

CA 2069517 11/1993

(Continued)

*Primary Examiner* — Joshua J Michener
*Assistant Examiner* — Justin Benedik
(74) *Attorney, Agent, or Firm* — Michael J. Femal; Much Shelist, P.C.

(57) ABSTRACT

A self-cleaning litter box (50) provides various advantages over the prior art. In particular, in one embodiment, the self-cleaning litter box (50) is configured to use a one piece litter cartridge (20) having a litter compartment (26) and a waste compartment 24. In another embodiment, the cartridge (20) is non-compartmentalized. In another embodiment, the system includes a rake assembly (56) configured with a drive assembly (58) that is protected from waste contamination. In accordance with the invention, the self-cleaning litter box (50) is configured to be used with all types of litter including crystal type litter.

60 Claims, 33 Drawing Sheets

U.S. PATENT DOCUMENTS

| | | | | |
|---|---|---|---|---|
| 4,325,325 | A | 4/1982 | Larter | |
| 4,325,822 | A | 4/1982 | Miller | |
| 4,574,735 | A | 3/1986 | Hohenstein | |
| 4,646,684 | A * | 3/1987 | Embry | 119/167 |
| 4,658,720 | A | 4/1987 | Massonnet | |
| 4,729,342 | A | 3/1988 | Loctin | |
| 4,779,510 | A | 10/1988 | Van den Abbeel | |
| 4,780,824 | A | 10/1988 | Niwa et al. | |
| 4,844,011 | A | 7/1989 | Strickland | |
| 4,846,104 | A | 7/1989 | Pierson | |
| 4,854,267 | A | 8/1989 | Morrow | |
| 4,862,830 | A | 9/1989 | Michael | |
| 4,879,741 | A | 11/1989 | Liu | |
| 4,934,317 | A | 6/1990 | Pourshalchi | |
| 4,949,672 | A | 8/1990 | Ratcliff et al. | |
| 4,949,673 | A | 8/1990 | Yamamoto | |
| 5,027,611 | A | 7/1991 | Doi et al. | |
| 5,048,463 | A | 9/1991 | Wilson et al. | |
| 5,048,465 | A | 9/1991 | Carlisi | |
| 5,107,797 | A | 4/1992 | LaRoche | |
| 5,184,575 | A | 2/1993 | Reinartz | |
| 5,188,062 | A | 2/1993 | Joy et al. | |
| 5,226,388 | A | 7/1993 | McDaniel | |
| 5,249,549 | A | 10/1993 | Rockaitis, III | |
| 5,259,340 | A | 11/1993 | Arbogast | |
| 5,267,530 | A | 12/1993 | Zamoyski | |
| 5,279,258 | A | 1/1994 | Kakuta | |
| 5,473,306 | A | 12/1995 | Adell | |
| 5,477,812 | A | 12/1995 | Waters | |
| 5,511,513 | A | 4/1996 | Baron et al. | |
| 5,544,620 | A | 8/1996 | Sarkissian | |
| 5,564,364 | A * | 10/1996 | Kovacs et al. | 119/163 |
| 5,592,900 | A | 1/1997 | Kakuta | |
| 5,749,318 | A | 5/1998 | Barbot et al. | |
| 5,931,119 | A | 8/1999 | Nissan et al. | |
| 6,065,429 | A * | 5/2000 | Crosse | 119/165 |
| 6,082,302 | A | 7/2000 | Thaler et al. | |
| RE36,847 | E | 9/2000 | Waters | |
| 6,202,585 | B1 | 3/2001 | Alan | |
| 6,205,954 | B1 | 3/2001 | Bogaerts | |
| 6,378,461 | B1 * | 4/2002 | Thaler et al. | 119/166 |
| 6,568,348 | B1 | 5/2003 | Bedard | |
| 6,588,369 | B2 | 7/2003 | Carlisi | |

FOREIGN PATENT DOCUMENTS

| | | |
|---|---|---|
| EP | 0154540 | 4/1985 |
| EP | 0227155 | 2/1986 |
| EP | 0297015 | 4/1988 |
| JP | 6-0181245 | 11/1994 |
| WO | WO/2005/029948 A3 | 2/2006 |

* cited by examiner

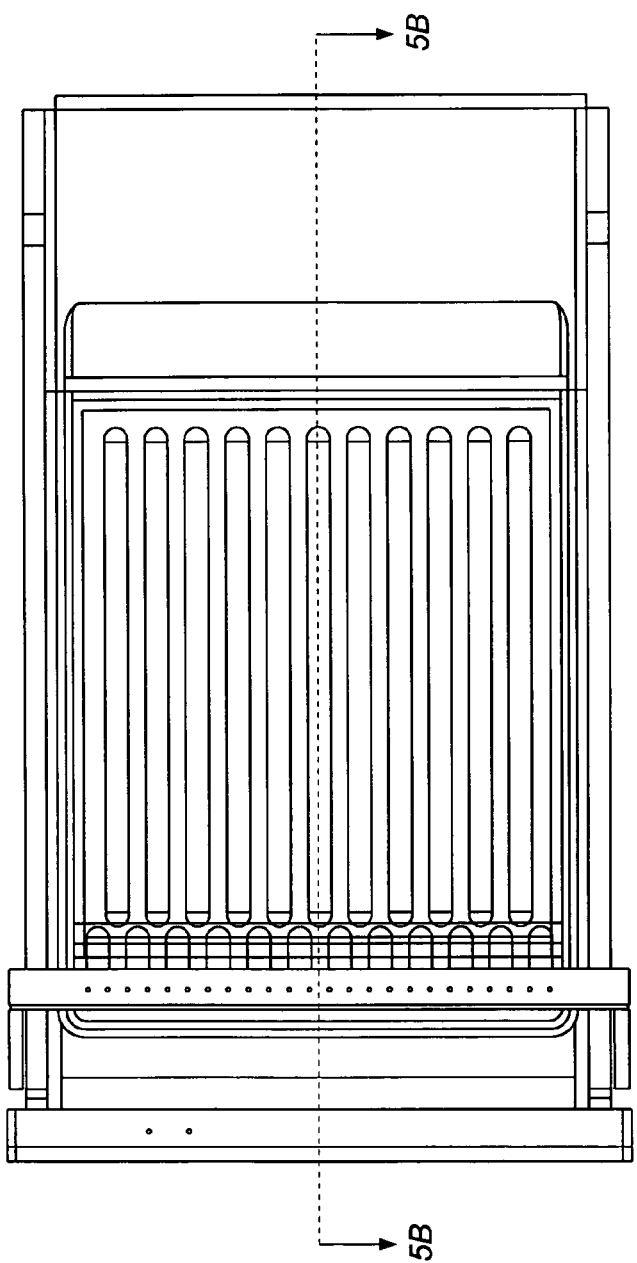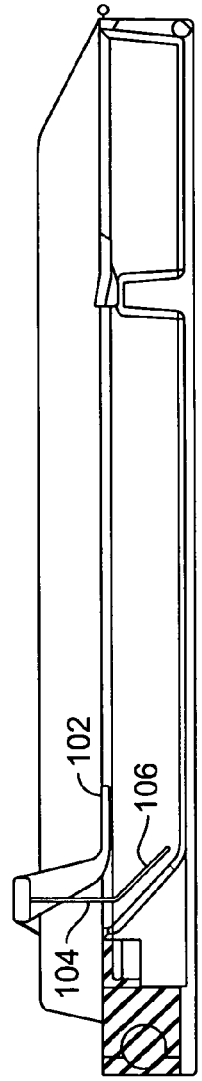
FIG 5A
FIG 5B

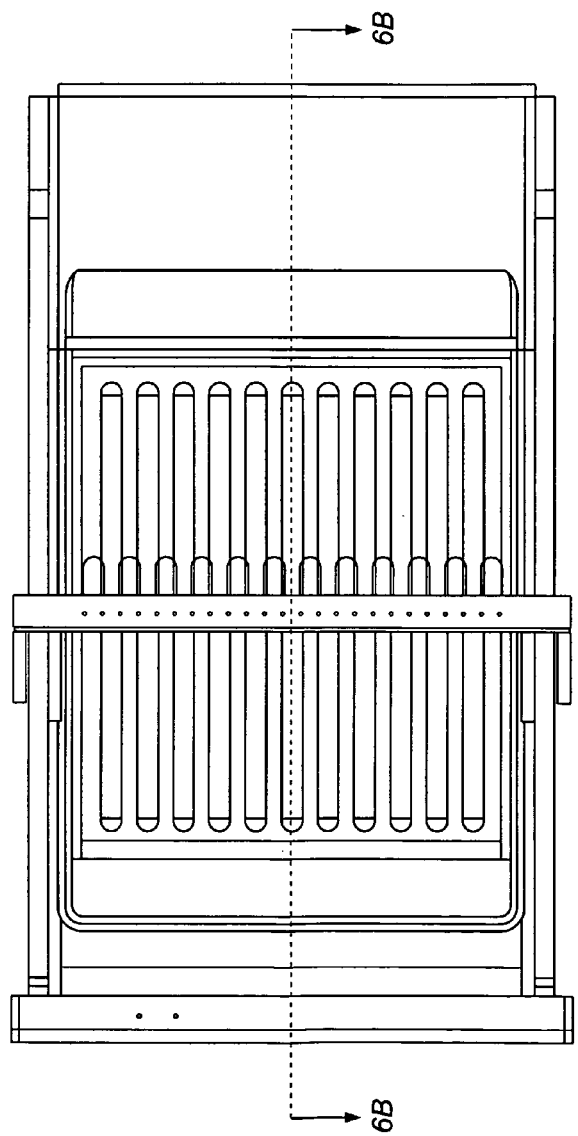
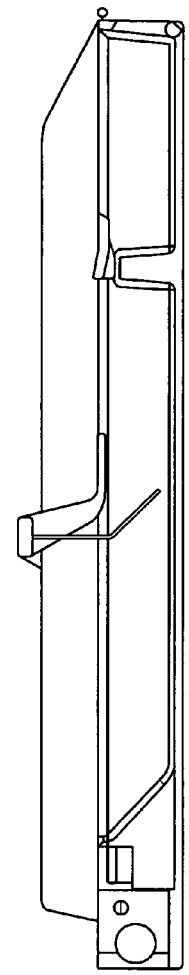
FIG 6A
FIG 6B

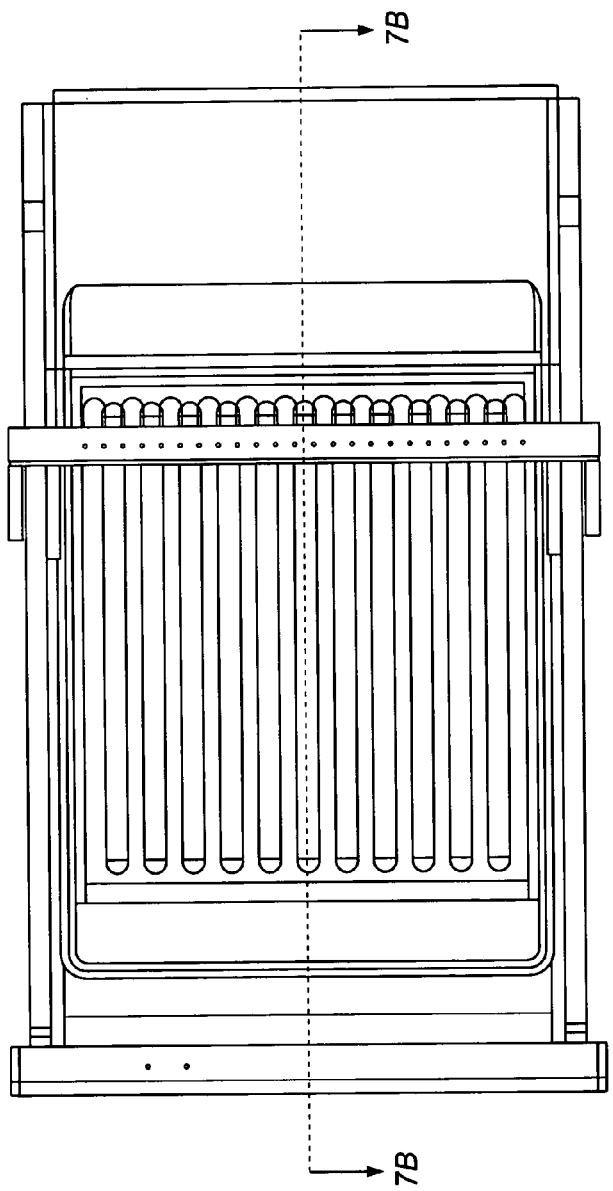
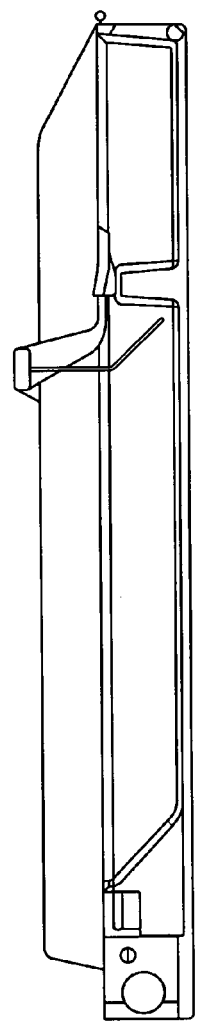
FIG 7A
FIG 7B

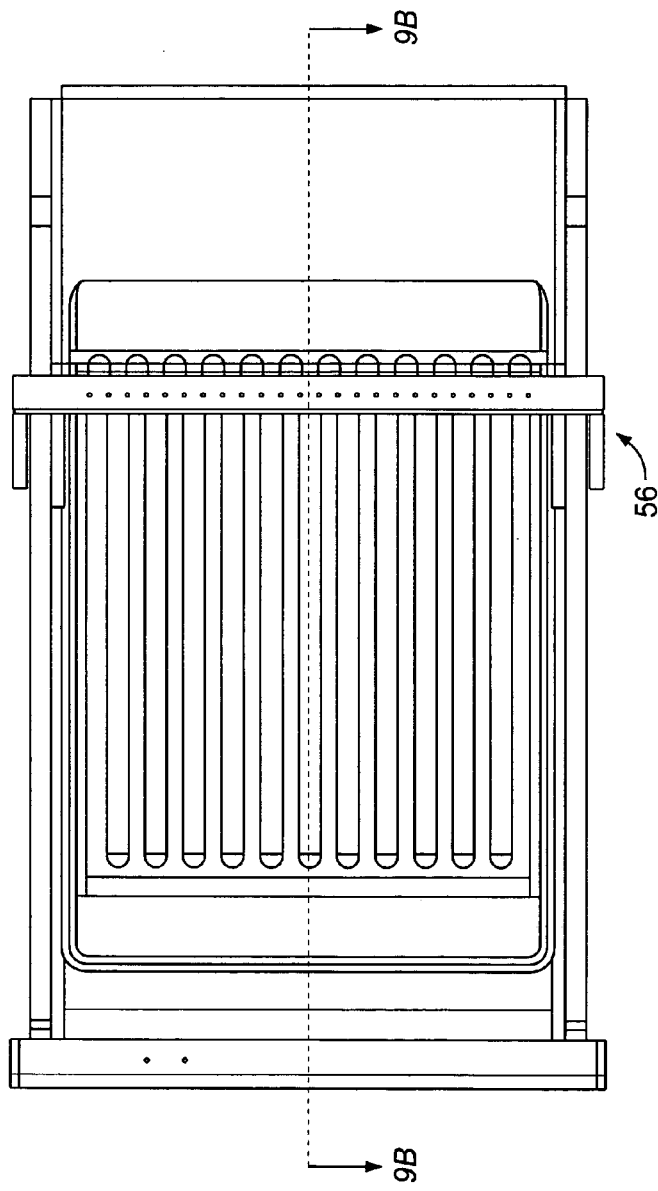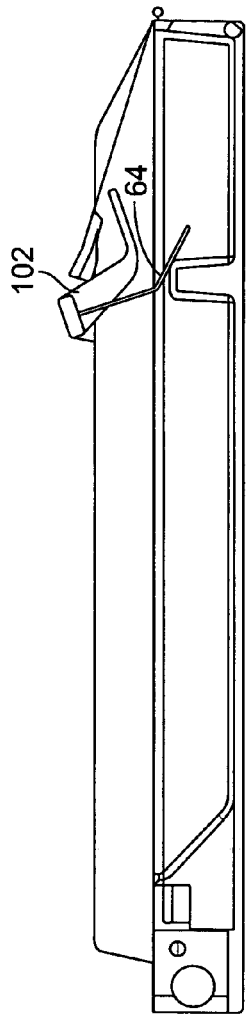
FIG 9A
FIG 9B

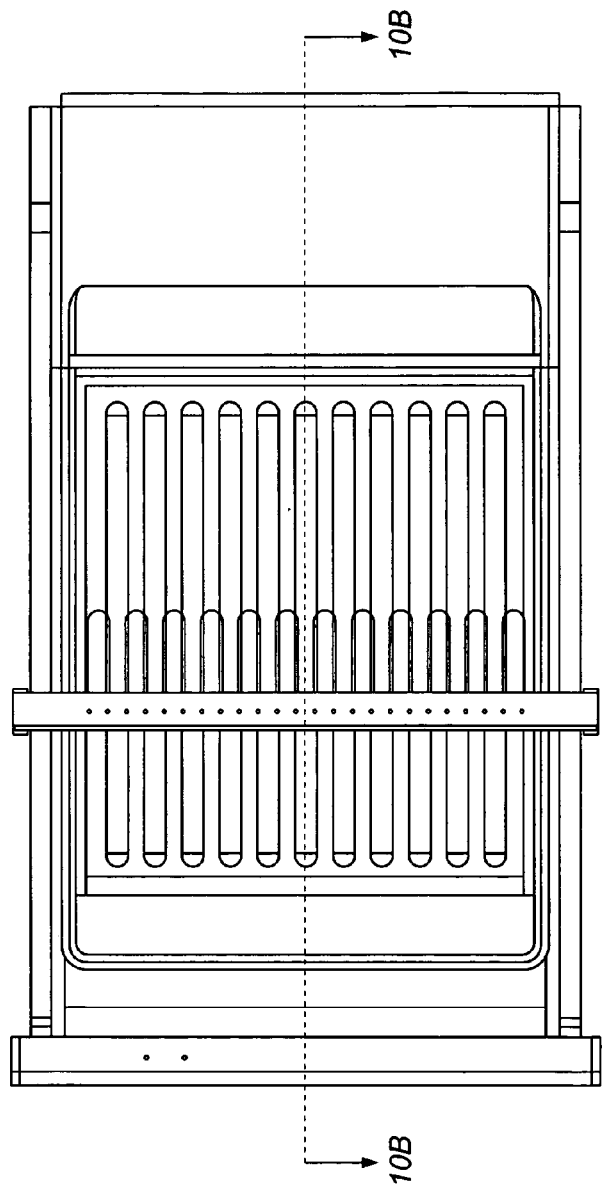
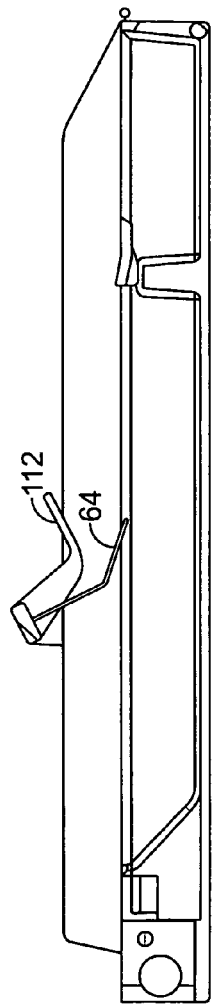
FIG 10A
FIG 10B

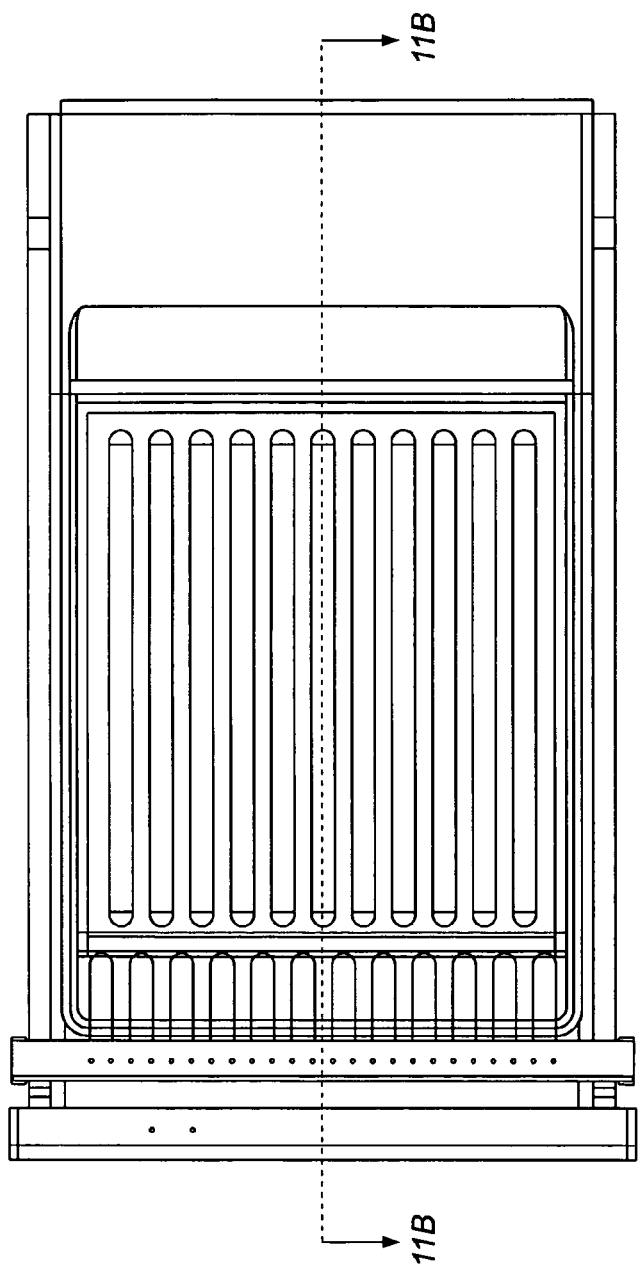
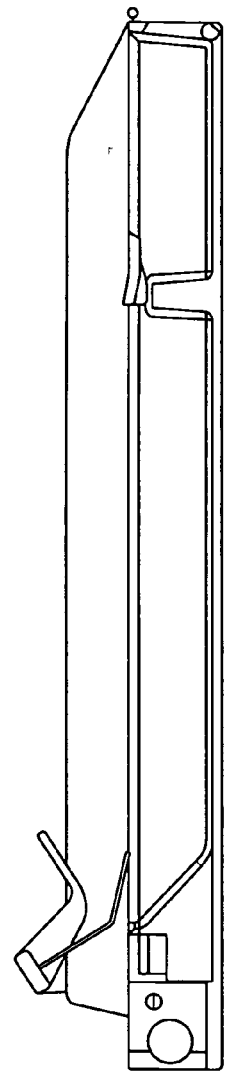
FIG 11A
FIG 11B

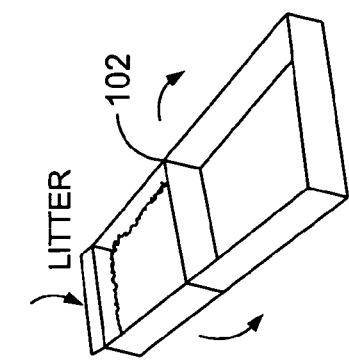
FIG. 14C
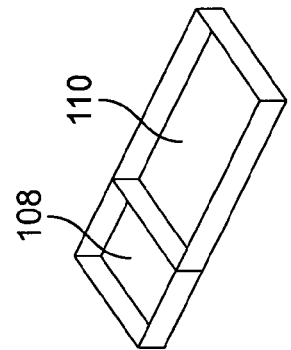
FIG. 15C
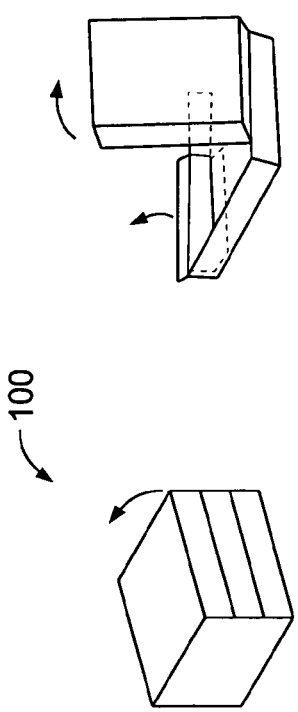
FIG. 14B
FIG. 15B
FIG. 14A
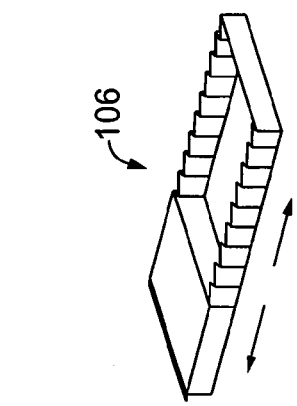
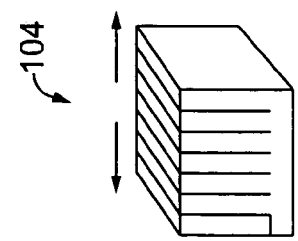
FIG. 15A

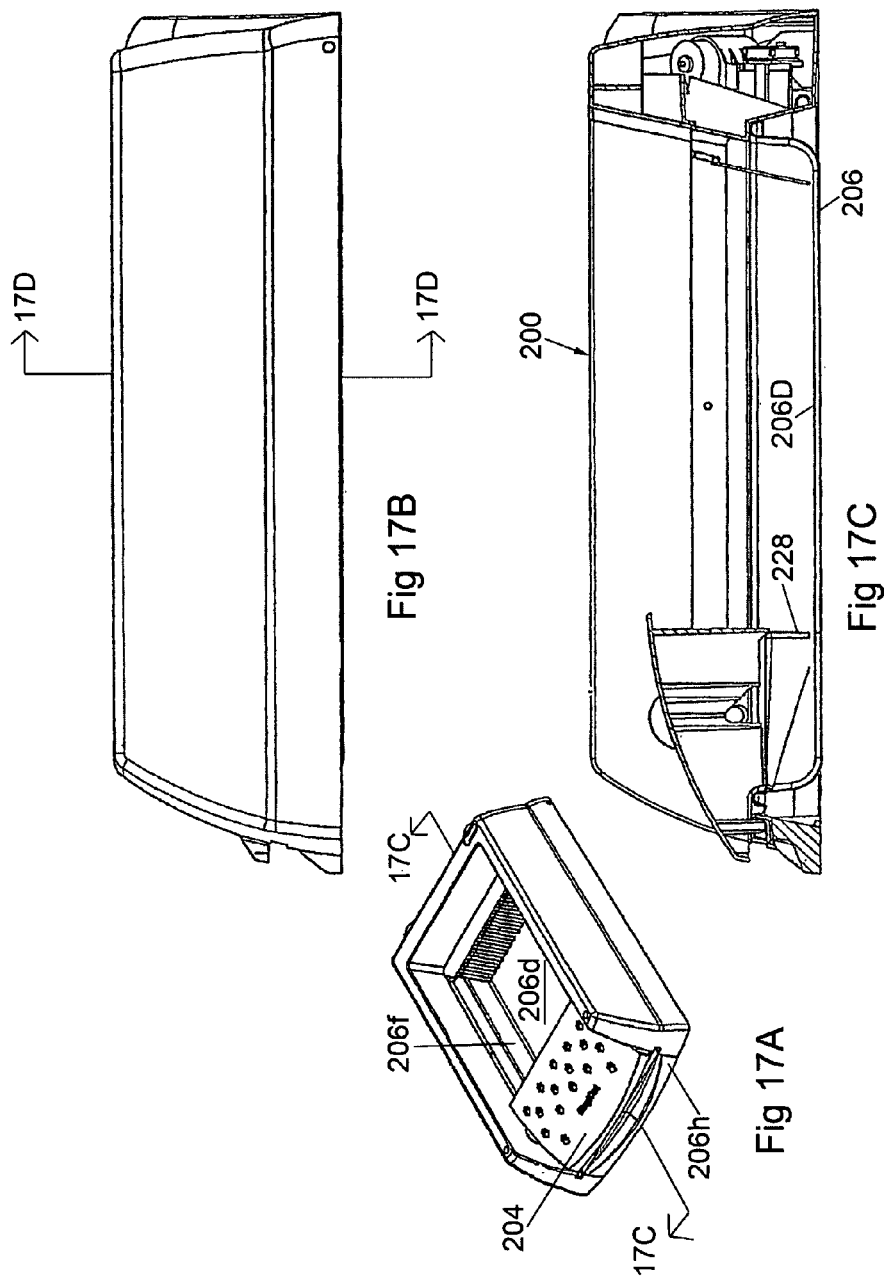

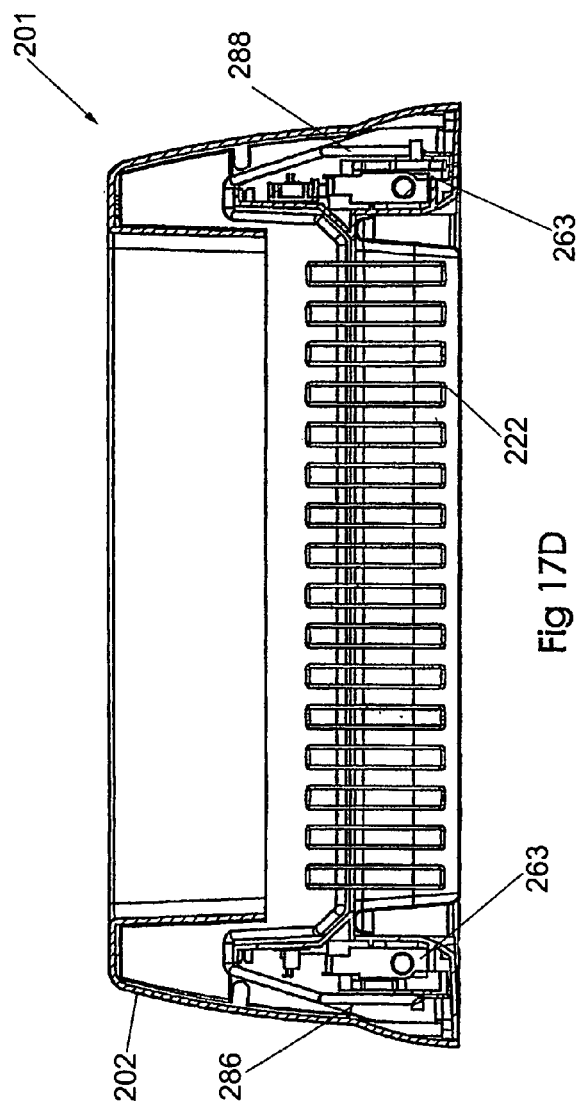

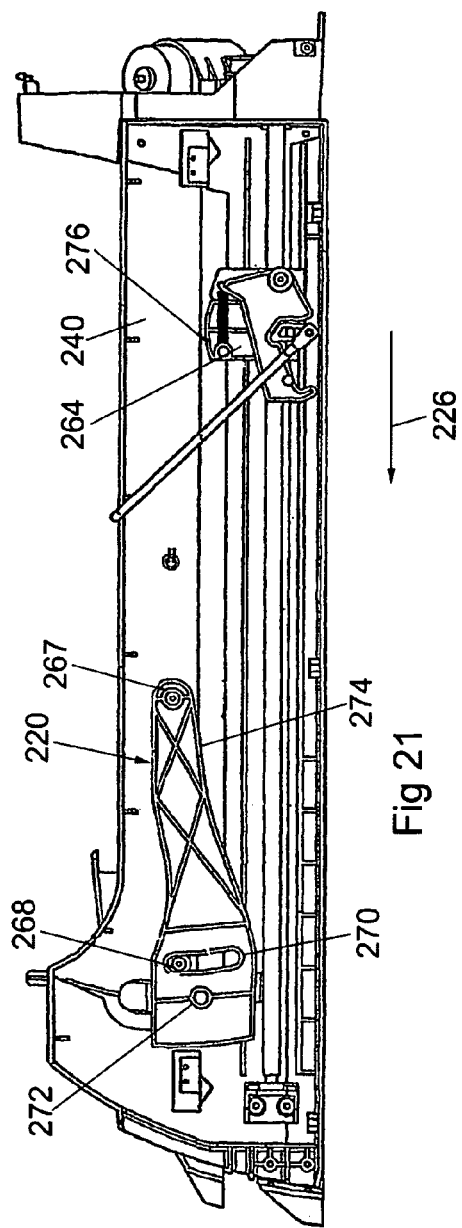

SELF-CLEANING LITTER BOX

RELATED APPLICATIONS

This application is a Divisional of U.S. patent application Ser. No. 10/574,068 filed Nov. 6, 2006, titled "Self-Cleaning Litter Box," which is a National Stage Entry (PCT/US04/32408) filed Sep. 30, 2004, titled "Self-Cleaning Litter Box," which claims priority of U.S. Provisional Patent Application No. 60/507,416 filed on Sep. 30, 2003, and titled "Self-Cleaning Litter Box", which are hereby incorporated by reference herein.

BACKGROUND OF THE INVENTION

1. Technical Field

The present invention relates to a self-cleaning litter box and more particularly to a self-cleaning litter box, which, in one embodiment, includes a disposable litter cartridge and an automatic rake assembly.

2. Description of the Prior Art

Various litter boxes are known in the art. Both reusable and disposable litter boxes are known. Reusable litter boxes are normally formed from plastic and are configured as a rectangular tray with 3-4 inch sidewalls. Normally, such reusable litter boxes need to be maintained daily or every few days. In order to facilitate the care and cleaning of litter boxes, disposable litter boxes have been developed. Examples of such disposable litter boxes are disclosed in U.S. Pat. Nos. 4,171,680; 4,271,787 and 6,065,429. Such disposable litter boxes normally include a disposable box or tray filled with an absorbent material, commonly known as kitty litter.

In order to further facilitate the upkeep of such litter boxes, self-cleaning litter boxes have been developed. Commercially available self-cleaning litter boxes primarily use "clay" or "clumping" litters and require the periodic addition of fresh kitty litter and the removal of waste every few days. Examples of such self-cleaning lifter boxes are disclosed in U.S. Pat. Nos.: 4,574,735; 5,048,465; 5,477,812; 6,082,302; 6,378,461; and Re 36,847, hereby incorporated by reference.

U.S. Pat. No. 4,574,735 discloses a self-cleaning litter box which includes a generally circular upper chamber, a lower disposable container, and a rotatable rake assembly. The rotatable rake assembly includes a plurality of tines that are horizontally oriented and connected to a centrally located spindle. The spindle, in turn, is driven by an electric motor by way of a gearing arrangement. Accordingly, when the electric motor is energized, the tines are rotated, thus pushing the solid waste products towards a discharge opening in the upper chamber that is in communication with the lower waste container. Unfortunately, such a configuration is not entirely efficient since it is known that, not all of the waste is discharged into the lower waste container.

In order to solve this problem, self-cleaning litter boxes have been developed which rely on linear motion of a rake assembly to deposit the waste into a waste compartment, located at one end of the litter box. For example, U.S. Pat. No. 5,048,465 discloses a self-cleaning litter box which includes a rake assembly, a removable and reusable litter tray and a disposable or reusable waste receptacle disposed at one end of the reusable litter tray. The rake assembly includes a plurality of tines used to comb in a linear motion fashion through the litter box. The tines are pivotally mounted. A stop, mounted at one end of the litter tray, causes the tines to rotate and lift the solid waste upwardly and over a wall separating the litter tray and the waste compartment. Once the extended end of the tines are rotated above the wall, continued motion of the rake assembly causes the extended ends of the tines to lift a lid and drop the solid waste products into the waste compartment. Although the self-cleaning litter box system disclosed in the '465 patent facilitates upkeep of the litter box, the litter tray must be refilled often; a cumbersome task. Further, the entire system must be periodically emptied and disassembled for cleaning; also a cumbersome task. Also, the relative complexity of the device results in the cost of the device being, relatively expensive.

U.S. Pat. Nos. 5,477,812; 6,082,302; 6,378,461; and Re. 36,847 also disclose self-cleaning litter boxes. Like the '465 patent, the self-cleaning litter boxes disclosed in these patents also include a reusable lifter tray and a disposable waste container.

There are various problems associated with the self-cleaning litter boxes disclosed in the above-mentioned U.S. patents. First, because these boxes often require the use of clumping litter, the waste bin fills quickly with clumped urine and solid waste. Therefore the waste bin must be emptied every few days or more frequently, especially in multiple cat applications. Second, removal of the waste container is cumbersome and often requires the user to come in contact with the waste. Third, fresh kitty litter must be added to the litter tray on an on-going basis. Fourth, the drive assembly in such self-cleaning litter boxes is known to include a drive motor that travels with the rake assembly in a toothed track that Is exposed to the litter area. By mounting the motor to the rake, electrical power is applied to a movable chassis, thus requiring a take up reel for an electrical cord, which is known to be inherently risky and prone to failure. When too much litter is used in the litter tray, the motor can be insufficient to drive the rake through the litter, thereby causing a jam which requires the owner to intervene. Conversely, if too little litter is used, or if the cat redistributes the litter in a particular way, a clump can cement to the bottom of the litter pan and prevent the rake from passing through the litter area. In other instances, the cat causes litter to accumulate in the tracks, also causing damage to the drive system and/or requiring further user intervention. Further, the electrical motor is not fully protected from urine, and can be damaged by the cat through normal operation. This motor is also known to be loud if the box is placed in close proximity to the user. Fifth, known self-cleaning litter boxes are not suitable for use with crystal litter. In particular, due to the irregular shape of the crystal litter and tendency to pack and interlock, a wave tends to build up in front of the rake assembly, which among other things, may prevent the rake assembly from completing a cleaning stroke. Thus, there is a need for a self-cleaning litter box which is easier to use than known self-cleaning litter boxes; is more reliable; does not expose electrical or mechanical components to contamination; eliminates the need for a take up reel; and is suitable for use with non-clumping litters such as crystal litter.

SUMMARY OF THE INVENTION

The present invention relates to a self-cleaning litter box which provides various advantages over the prior art. In particular, in one embodiment, the self-cleaning litter box is configured to use a disposable cartridge that is pre-filled with litter and configured to both provide litter and contain waste, thus eliminating the need for the user to dean the litter tray and handle heavy litter supply containers. In other embodiments, the system includes a rake assembly configured with a drive assembly that is protected from contamination. In accordance with another embodiment of the invention, the self-cleaning litter box includes a rake assembly which includes a plurality of spaced apart tines that is configured so that all types of litter including crystal type litter can be used.

DESCRIPTION OF THE DRAWING

These and other advantages of the present invention will be readily understood with reference to the following specification and attached drawing wherein.

FIG. 5A is a top view of the self-cleaning litter box illustrated in FIG. 2, shown with the rake assembly in a position opposite the waste storage position.

FIG. 5B is a sectional view along lines 5B-5B of FIG. 5A.

FIG. 6A is a top view of the self-cleaning litter box illustrated in FIG. 2, shown with the rake assembly in an intermediate position during the cleaning stroke.

FIG. 6B is a sectional view along lines 6B-6B of FIG. 6A.

FIG. 7A is a top view of the self-cleaning litter box illustrated in FIG. 2, shown with the rake assembly in a position at the end of the cleaning stroke.

FIG. 7B is a sectional view along lines 7B-7B of FIG. 7A.

FIG. 9A is a top view of a self-cleaning litter box illustrated in FIG. 2, shown with the rake assembly in a dumping position.

FIG. 9B is a sectional view along lines 9B-9B of FIG. 9A.

FIG. 10A is a top view of the self-cleaning litter box illustrated in FIG. 2, shown with the rake assembly at an intermediate position during the backstroke.

FIG. 10B is a sectional view along lines 10B-10B of FIG. 10A.

FIG. 11A is a top view of the self-cleaning litter box illustrated in FIG. 2, shown with the rake assembly at the end of its backstroke.

FIG. 11B is a sectional view along lines 11A-11A of FIG. 11A.

FIGS. 14A-14C illustrate an alternate embodiment of a litter cartridge in accordance with the present invention.

FIGS. 15A-15C illustrate another alternative embodiment of a litter cartridge in accordance with the present invention.

FIG. 17A is another isometric view of the self-cleaning litter box illustrated in FIG. 16, shown in a use position.

FIG. 17B is a side elevational view of the self-cleaning litter box illustrated in FIG. 17A.

FIG. 17C is a sectional view along lines 17C-17C of FIG. 17A.

FIG. 17D is a sectional view along lines 17D-17D of FIG. 17B illustrating an exemplary labyrinth seal in accordance with one aspect of the invention.

FIG. 21 is a side view of the self-cleaning litter box with the top housing removed, illustrated in FIG. 16.

DETAILED DESCRIPTION

The present invention relates to a self-cleaning litter box. Various embodiments of the invention are contemplated. One embodiment is illustrated in FIGS. 1-15. A second embodiment is illustrated in FIGS. 16-27. In both illustrated embodiments, the self-cleaning litter box includes a litter tray, a rake assembly and a drive assembly. The broad principles of the invention are applicable to both disposable and reusable litter trays. In the embodiment illustrated in FIGS. 1-15, a disposable litter tray is provided and configured with two compartments: a litter compartment and a waste compartment. The embodiment illustrated in FIGS. 16-27 illustrates an embodiment in which the litter tray may also be disposable and not compartmentalized.

First Embodiment

As mentioned above, the first embodiment is illustrated in FIGS. 1-15 and includes a litter tray, rake assembly, drive assembly, and a controller. In that embodiment, a disposable litter tray is provided that is compartmentalized and includes a litter compartment and a waste compartment. The waste compartment may be provided with a hinged cover. The rake assembly includes a plurality of tines carried by a movable chassis that is adapted to comb the litter compartment during a cleaning stroke. As the rake assembly completes its cleaning stroke, further movement of the rake assembly in the direction toward the waste compartment causes a lifting arm or lever to lift the cover to enable the solid waste material to be deposited into the waste compartment. In a storage position, the rake assembly rests at one end of the litter box with the tines below the fill level of the litter to form a compact profile.

As will be discussed in more detail below, the various embodiments of the present invention provide various advantages over the prior as will be discussed in detail below. First, the self-cleaning litter box may be configured for use with a disposable litter tray. Second, the drive assembly for the rake may be configured to be protected from contamination. Third, the rake may be configured to be used with all types of litter including crystal litter.

Litter Cartridge

Figure 1:
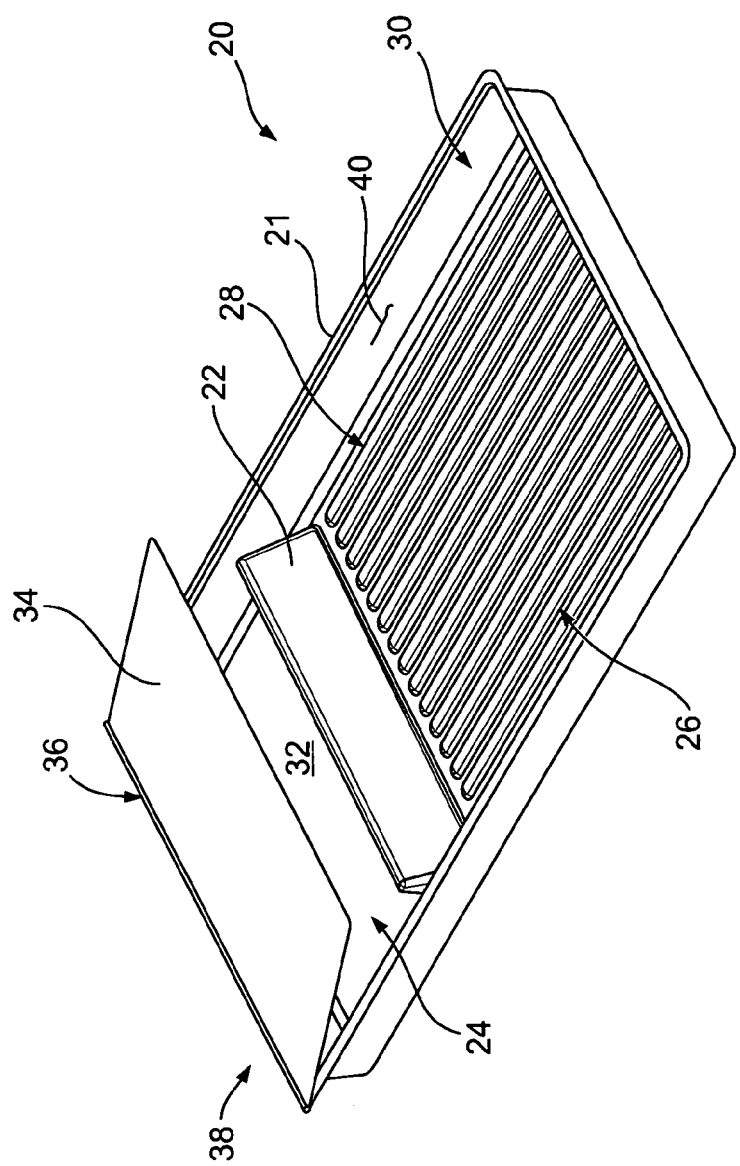
FIG. 1 is a perspective view of a rectangular cartridge configured with a litter compartment and a waste compartment in accordance with one embodiment of the present invention.

In one embodiment of the invention as illustrated In FIG. 1, the self-cleaning litter box is configured to receive a litter cartridge, which may be disposable. However, even though the self-cleaning litter box 50 is illustrated and described with a disposable litter cartridge 20, the principles of the present invention are applicable to reusable litter trays as well.

FIG. 1 illustrates a compartmentalized litter cartridge which defines a litter compartment and a waste compartment. The litter cartridge illustrated in FIG. 1 includes a separator wall between the litter compartment and the waste compartment. As such, the litter cartridge illustrated in FIG. 1 must be used with a rake assembly that can lift the rake, for example, the rake assembly described and illustrated in connection with FIGS. 3-13.

The disposable litter cartridge 20 facilitates the upkeep of the litter box. As shown in FIG. 1, the disposable litter cartridge, generally identified with the reference numeral 20, may be formed as a generally rectangular tray with a peripheral lip 21 defining a plurality of sidewalls 30 and a floor 32. A separator wall 22 defines a waste compartment 24 and a litter compartment 26. Ribs 28 may be formed in the floor 32 of the-litter compartment 24 for extra strength. The waste compartment 24 may be provided with a hinged cover 34. Various hinges 36 are suitable for this application. For example, the hinge 36 may be a living hinge or other type of hinge. The type of hinge is not critical. The cover 34 is hinged on one end of 38 of the tray.

The cartridge 20, as well as the cartridge 206 described below, may be formed from various plastic materials, such as polyethylene terephthalate (PET) or polypropylene and formed by injection molding or vacuum formed. The cartridge 20 may be made from other materials, such as cardboard, and lined with a plastic liner, for example.

The cartridge 20 is dimensioned to be received within the self-cleaning litter box illustrated in FIGS. 2-10. Registration features may be incorporated into the disposable cartridge 20 as well as the litter box to prevent unapproved litter cartridges from being installed in the litter box as well as preventing the cartridge from being installed improperly. For example, one or more spaced apart transverse slots (not shown) may be formed in bottom of the tray. The spaced apart slots may be configured to receive the bars extending across the litter box. Other registration methods are also contemplated.

In a shelf position, in one embodiment of the invention, the cartridge 20 contains litter up to a fill line 40 and sealed with a removable cover (not shown) and sealed to the lip 21. The cover 34 over the waste compartment may be initially sealed by way of an adhesive applied to the lip 21 as well.

Replacement of a cartridge 20 is as simple as removing the old cartridge and replacing it with a new cartridge. Such a configuration provides many benefits relative to known systems. First, the configuration eliminates the need to handle relatively heavy litter supply containers. Second, since the cartridge 20 is disposable, there is no need to clean the tray. Third, the user is not exposed to a dust cloud that is normally created when the litter is poured into a litter tray.

FIGS. 14A-14C and FIGS. 15A-15C illustrate exemplary alternative embodiments of the disposable cartridge 20 illustrated in FIG. 1. These exemplary embodiments are configured to minimize retail shelf space. The first alternate embodiment is illustrated in FIGS. 14A-14C and identified with the reference numeral 100 and includes a generally rectangular tray configured with one or more fold lines 102 to enable the tray 100 to be folded in halves or thirds. The second alternate embodiment illustrated in FIGS. 15A-15C, generally identified with the reference numeral 104, may include a single fold line 106 defining two compartments 108 and 110. One of the two compartments may be configured with accordion type folds as shown in FIG. 15B to enable the tray to be compressed as shown in FIG. 15A.

Figure 19:
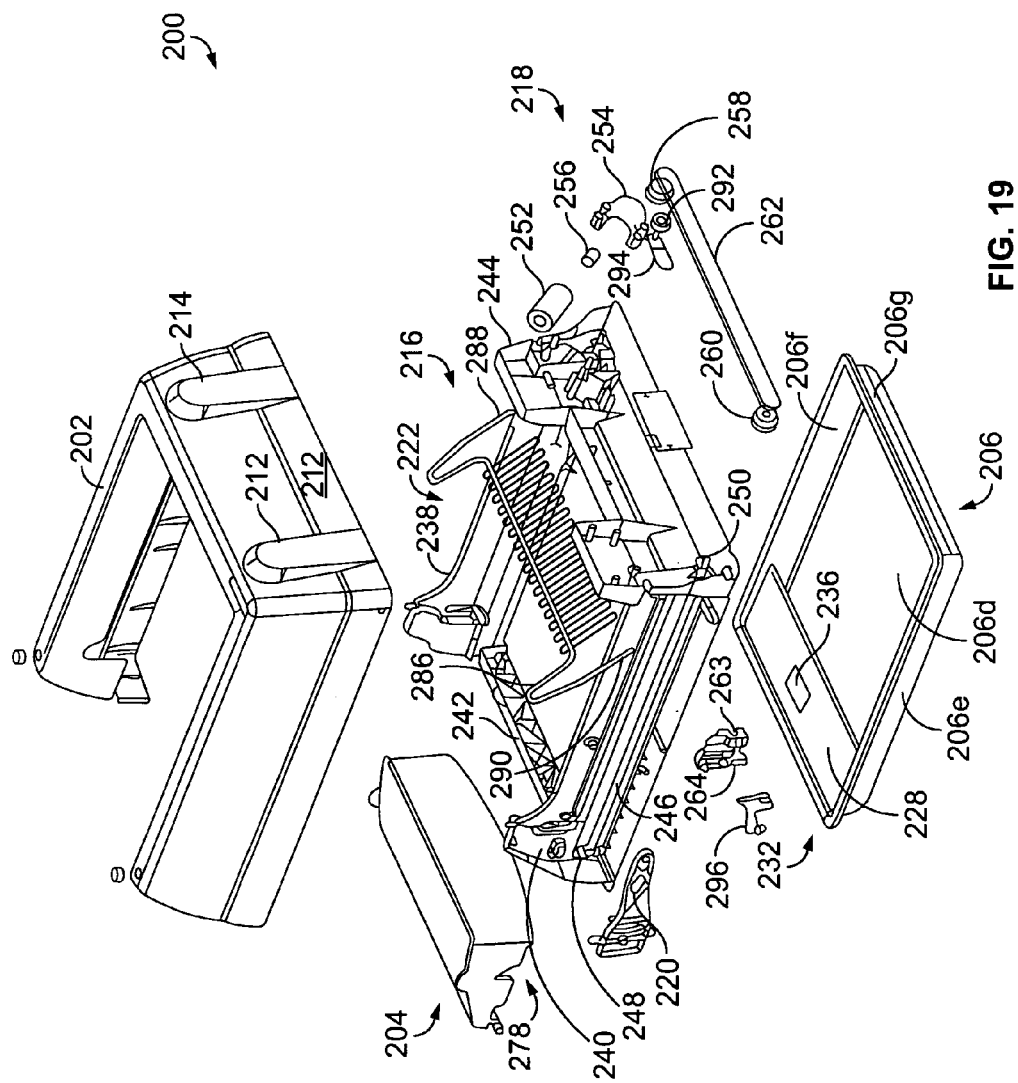
FIG. 19 is an exploded isometric view of the self-cleaning litter box illustrated in FIG. 16 which illustrates a first embodiment of the drive assembly which includes a drive nut and a nut follower.

Another alternate embodiment of the litter cartridge is illustrated in FIG. 19. In this embodiment, the litter tray is formed as a generally rectangular tray that is not compartmentalized, which may be disposable. The tray may have a small lid at one end to cover the waste and may have a larger cover to enclose the entire tray for shipment. An important aspect of the non-compartmentalized litter cartridge is that it simplifies the drive assembly and the rake assembly. More particularly, the litter cartridge illustrated in FIG. 19 does not include a separator wall. As such the rake assembly can stay at one level (i.e. travel in a single horizontal plane) during all operational modes since the rake assembly does not have to be lifted over a separator wall. As such, the litter cartridge illustrated in FIG. 19 may be used with the drive assembly illustrated in FIGS. 19-24. With a rake assembly that stays at one level, the mechanism driving the rake assembly is simplified, improving reliability and reducing cost.

An additional benefit of the non-compartmentalized litter tray is that the waste is always in contact with the litter. As such, the odor is reduced and drying of the waste is optimized. The solid waste is not removed from the litter as is commonly done with other litterboxes.

Figure 18A:
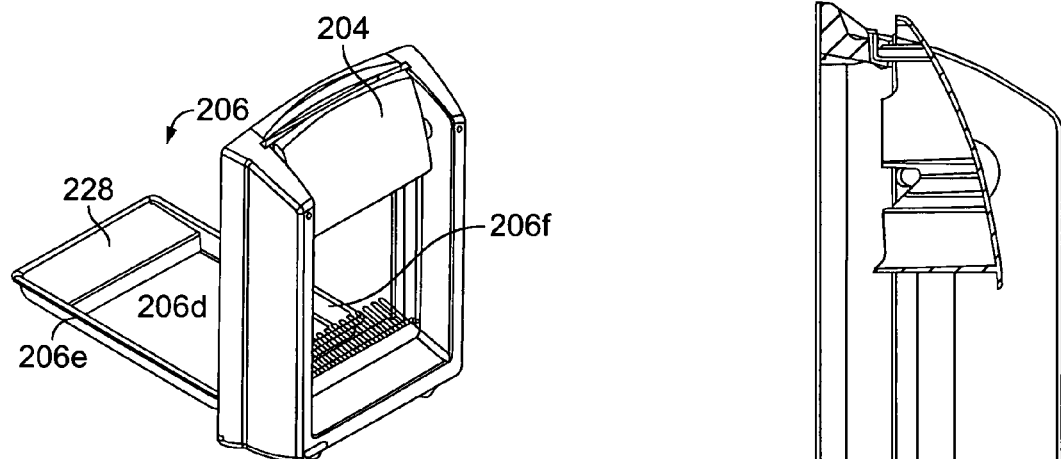
FIG. 18A is an isometric view of the self-cleaning litter box illustrated in FIG. 17, shown in a position which enables the litter tray to be removed.

In an off-the-shelf position, the litter tray may contain litter, which may be crystal or otherwise, and enclosed with a removable cover material, such as shrink wrap or the like. The tray 206 may be placed in use by removing the removable cover and lowering the self-cleaning litter box 200 over the litter tray 206, as generally shown in FIGS. 17A and 18A.

Self-Cleaning Litter Box

Figure 2:
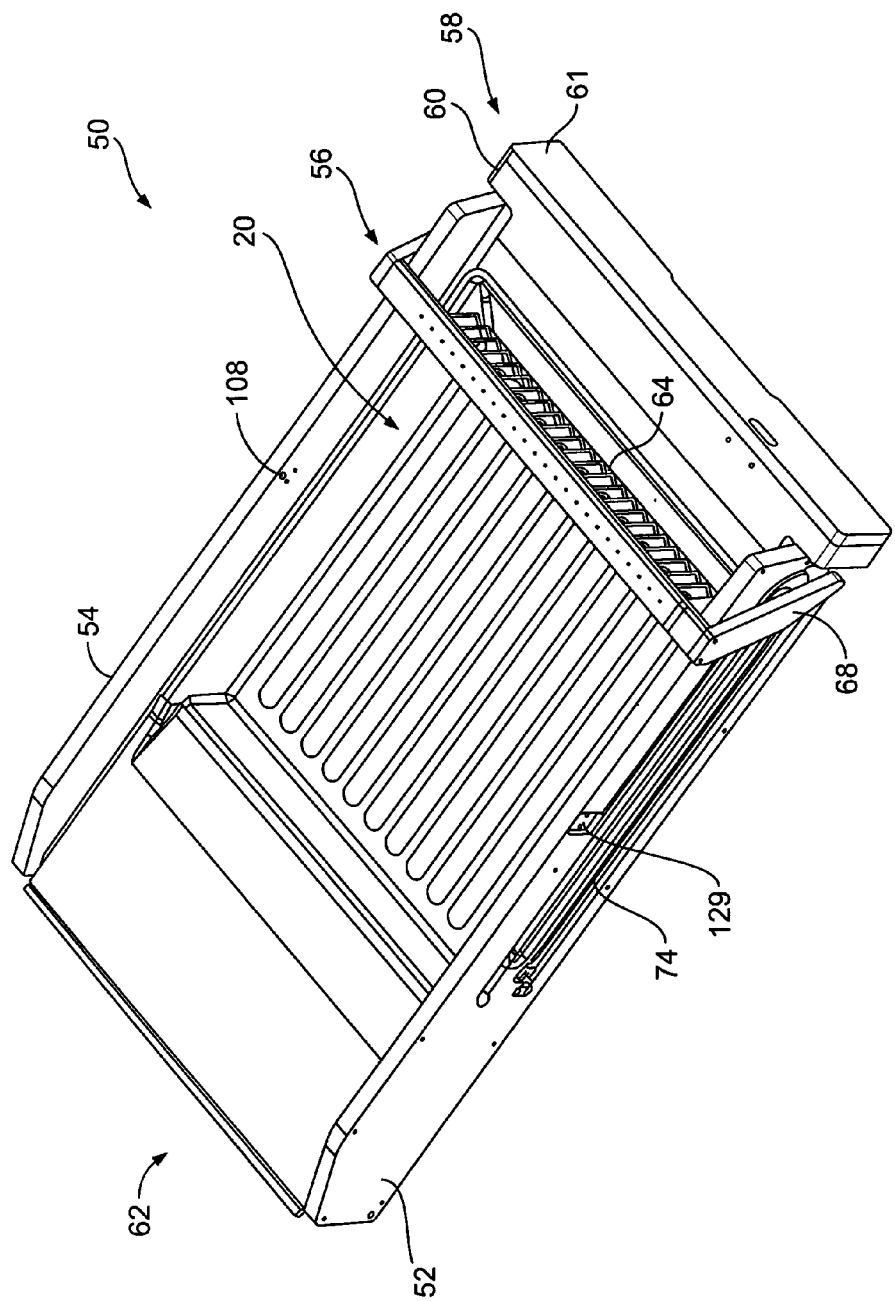
FIG. 2 is a perspective view of the self-cleaning litter box in accordance with one embodiment of the present invention shown with the rake assembly in a position opposite the waste storage position.

The self-cleaning litter box in accordance with the present invention is illustrated in FIG. 2 and generally identified with the reference numeral 50. The self-cleaning litter box may be used with or without a disposable litter cartridge 20. The self-cleaning litter box 50 may include a pair of spaced apart side rails 52 and 54, a rake assembly 56 and a drive assembly 58. One or more rods 61 may be used to connect the side rails 52 and 54 together.

The rake assembly 56 includes a number of tines 64 that are used to comb through the litter in the litter compartment 26 of the litter tray or disposable litter cartridge 20, 100 or 104. The tines 64 are angled backward with respect to the motion direction of the raking assembly and are carried by a chassis or bridge 66, transversely disposed above the litter box 50. The chassis 66 carries a plurality of spaced apart tines 64 and is supported by a pair of spaced apart side plates 68 and 70.

Figure 3:
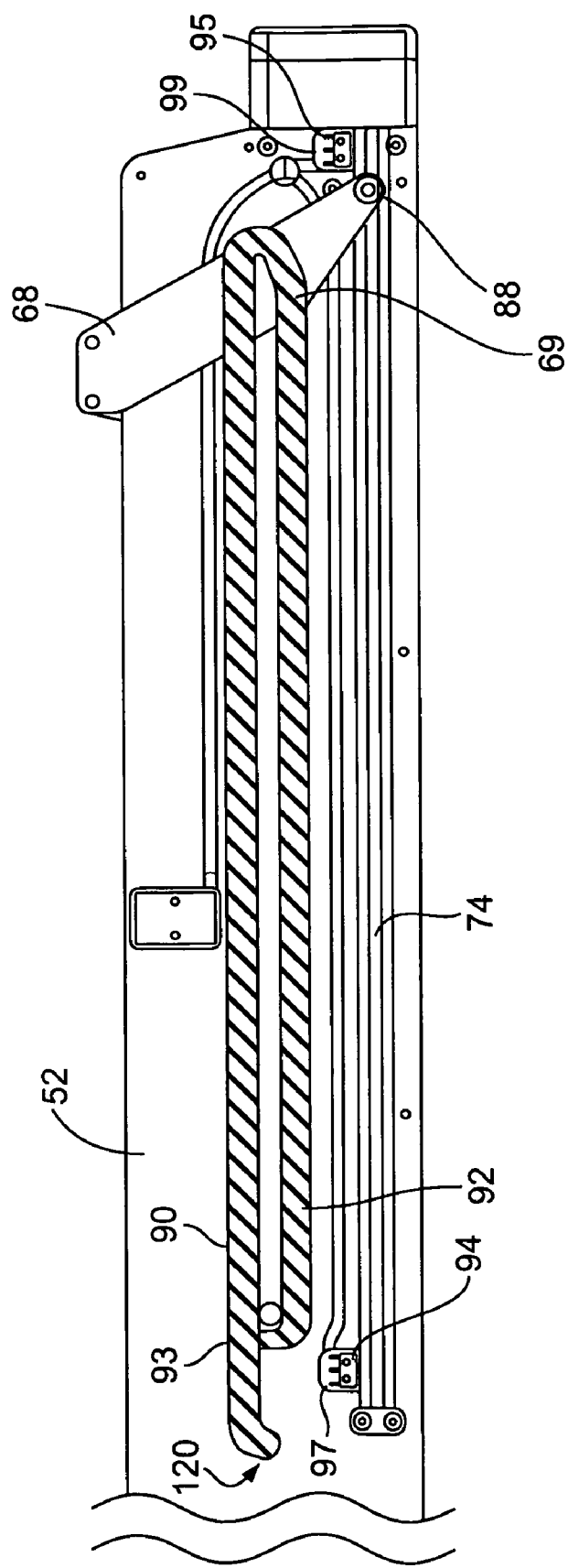
FIG. 3 is a partial side view of the self-cleaning litter box shown in FIG. 2, illustrating the side rail detail.

The drive assembly 58 may include a drive motor 71, for example, a reversible electrical motor (FIG. 4) and a drive assembly. Various drive assemblies are suitable. For example, the drive assembly may include a pair of spaced apart lead screws 72 and 74, driven by the drive motor 71. As best shown in FIGS. 2 and 3, the lead screws 72 and 74 may be disposed in elongated slots in the side rails 52 and 54. A pair of extending shafts 76 and 78 are coupled to the drive motor 71 by way of a pair of couplings 80 and 82. The extended ends of the shafts 76 and 78 may be attached to worm gear assemblies 84 and 86, which, in turn, are used to drive the lead screws 72 and 74. The worm gear reduction may be, for example, 20:1 which, in combination with a small pitched lead screw (M6-1.0 thread) allows for a high reduction ratio between the high speed electric motor and the slow moving rake without the need for a motor gear head. The rake side plates 68 and 70 may be pivotally connected to the lead screws 72 and 74 by way of a pair of nuts 88 (FIG. 3). Thus, as the lead screws 72 and 74 are rotated by the electrical motor 71, the nuts 88 are advanced along the lead screws 72 and 74, thus advancing the rake assembly 56. Other drive assemblies are suitable for use with the present invention, such as drive belt, pneumatic cylinder or the like.

The height and angle of the tines 64 is automatically controlled by the shape of a pair of upper and lower slots 90 and 92 (FIG. 3) formed in the side rails 52 and 54, which define tracks. In particular, guides or rollers (not shown) may be coupled to the side plates 68. The guides are connected to a mounting hole 69 (FIG. 3) formed in the rake side plates 68 and 70. Each guide is configured to either slide or roll in one of the tracks 90, 92 formed in the side rails 52 and 54.

The lower track 92 causes the tines 64 to be in a cleaning position during a cleaning stroke as shown in FIG. 5B, while the upper track 90 causes the tines to be in a transport position during a back stroke as shown for example in FIG. 10B. After the cleaning stroke, the rollers and thus the rake assembly 56 transitions from the lower track 92 to the upper track 90. In order to prevent the rollers from returning to the lower track 92, a spring loaded pawl 93 may be provided. The spring loaded pawl 93 pivots clockwise to allow the roller to transition from the lower track 92 to the upper track 90. Continued forward motion of the roller by the drive motor 71 causes the rollers and the rake assembly 56 to move to the left (FIG. 3) to a point 100 where the solid waste is deposited in the waste compartment 24.

A pair of microswitches 94 and 98 may be used to reverse the direction of the electrical motor 71. In particular, after the solid waste is dumped into the waste compartment 24, a first microswitch 94, located adjacent the left end (FIG. 3) of the lower track 92 is tripped by the rake assembly 56. This action causes the drive motor 71 and thus the rake assembly 56 to reverse directions. In particular, after the first microswitch 94 is tripped, the rake assembly 56 travels to the right (FIG. 3). As the rake assembly 56 trips a second microswitch 95, located adjacent to the right end (FIG. 3) of the lower track 92, the direction of the drive motor 71 is again reversed so that the rake assembly 56 will travel to the left (FIG. 3) during a cleaning stroke.

Figure 8A:
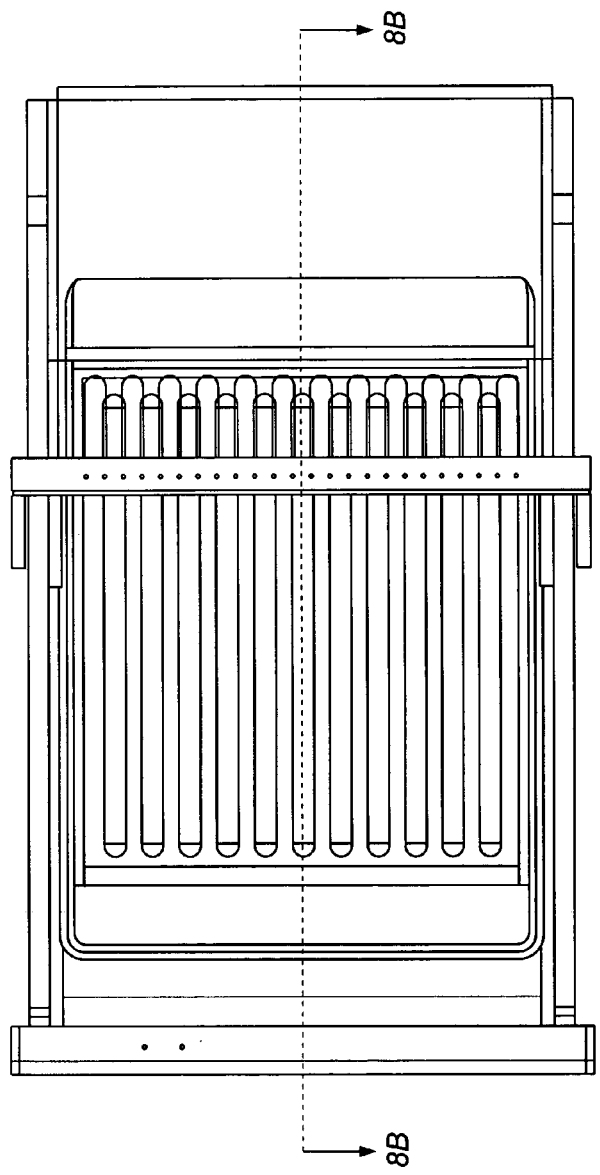
FIG. 8A is a top view of the self-cleaning litter box illustrated in FIG. 2, in accordance with the present invention shown at a position where the rake assembly is lifting the cover on the waste compartment.
Figure 8B:
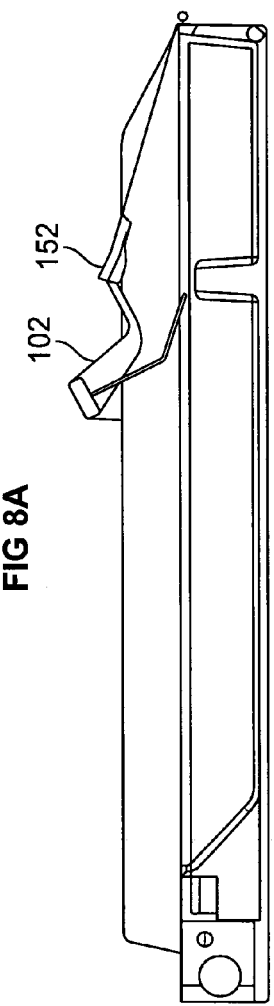
FIG. 8B is a sectional view along lines 8B-8B of FIG. 8A.

As shown in FIG. 5B, a lever or lift arm 102 may be provided. The lift arm 102 is rigidly attached to the one of the rake side plates 68, 70. Thus, as the roller on the rake assembly 56 transitions from the lower track 92 to the upper track 90, the lift arm 102 is raised as illustrated in FIG. 8B, which raises the lift arm 34 over the waste compartment) 24 of the cartridge 20 to enable solid waste to be deposited in the waste compartment 34 of a disposable litter cartridge.

As shown in FIG. 2, an optical sensor, for example, an infrared emitter 108 and an infrared detector 110 may be provided to sense the presence of a cat in the litter box 50. The infrared emitter 108 may be coupled to one side rail 54, while the infrared detector 110 may be carried by the opposing side rail 56. The status of the infrared detector 110 is continuously monitored as will be discussed in more detail below. During normal operation, an infrared beam is continuously sensed by the infrared detector sensor 110. When the infrared beam is interrupted, the system assumes that a cat is in the litter box 50. After the beam is restored (i.e., sensor 110 detects the beam once again), the system initiates a cleaning cycle, after a predetermined time period, which may be selectable by the user, for example, 5 minutes or more.

Figure 4:
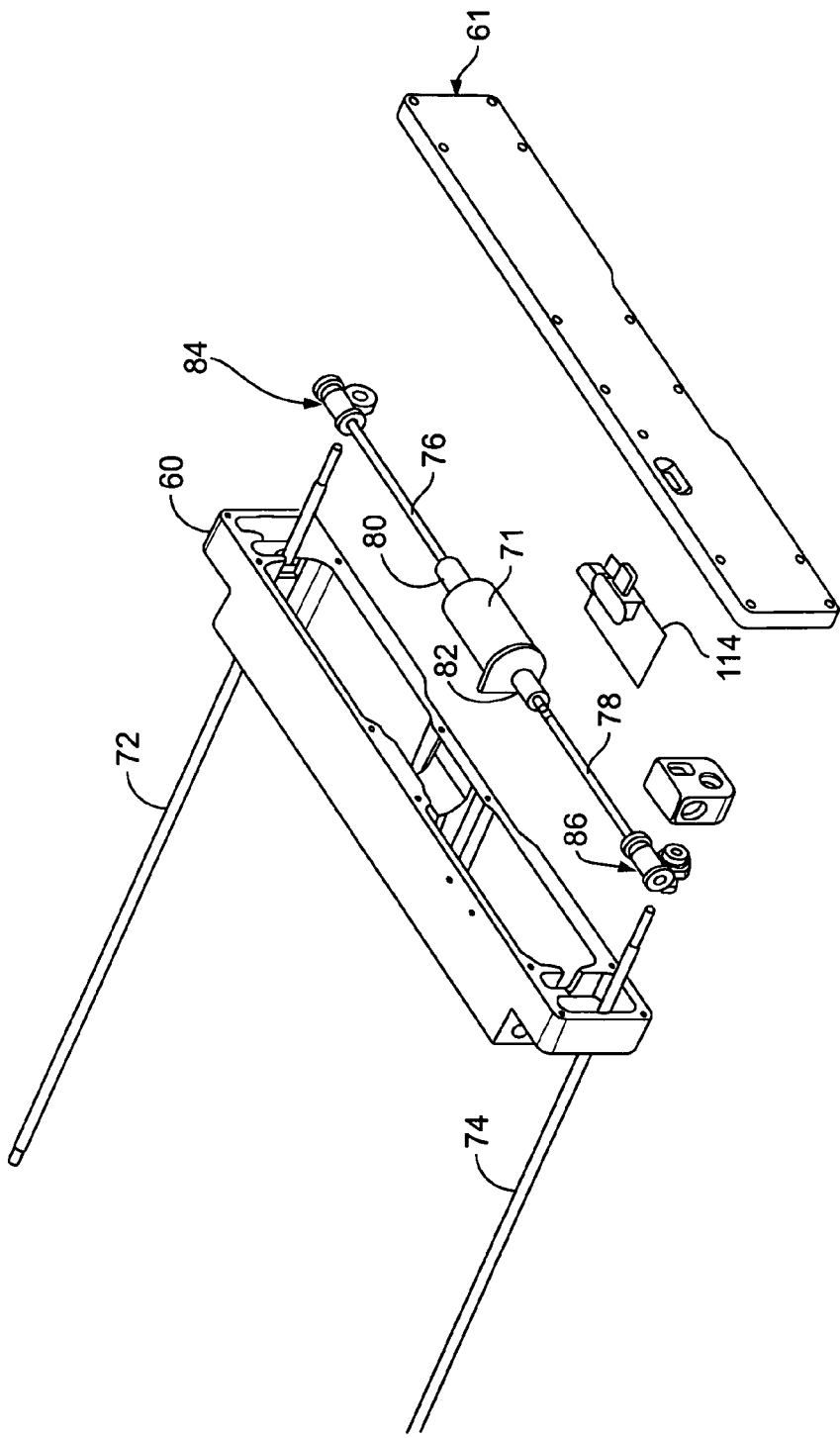
FIG. 4 is an exploded perspective view of the drive assembly for use with the self-cleaning litter box illustrated in FIG. 2.
Figure 12A:
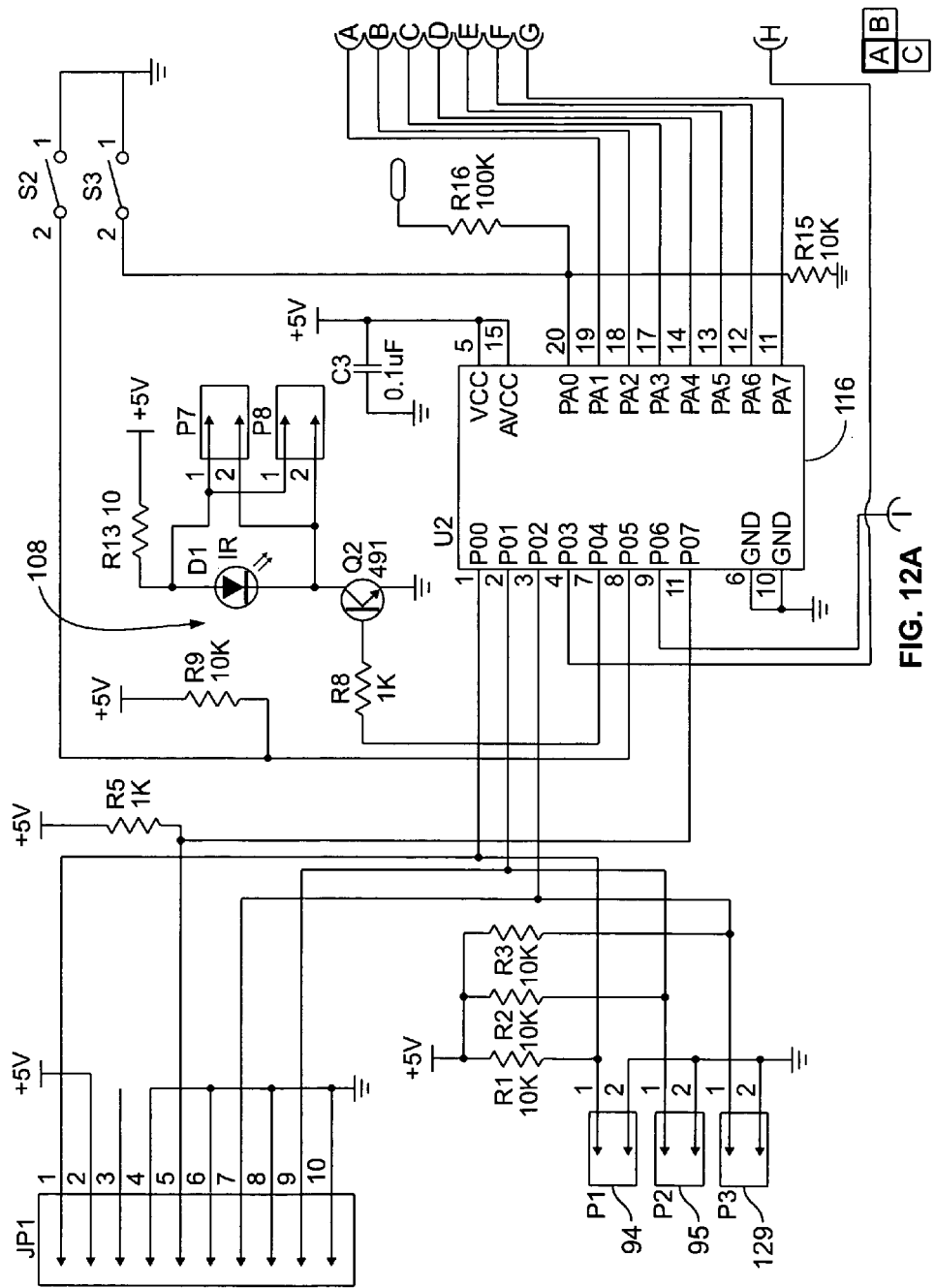
FIG. 12 is an exemplary schematic diagram of the control system for the self-cleaning litter box illustrated in FIG. 2.
Figure 12B:
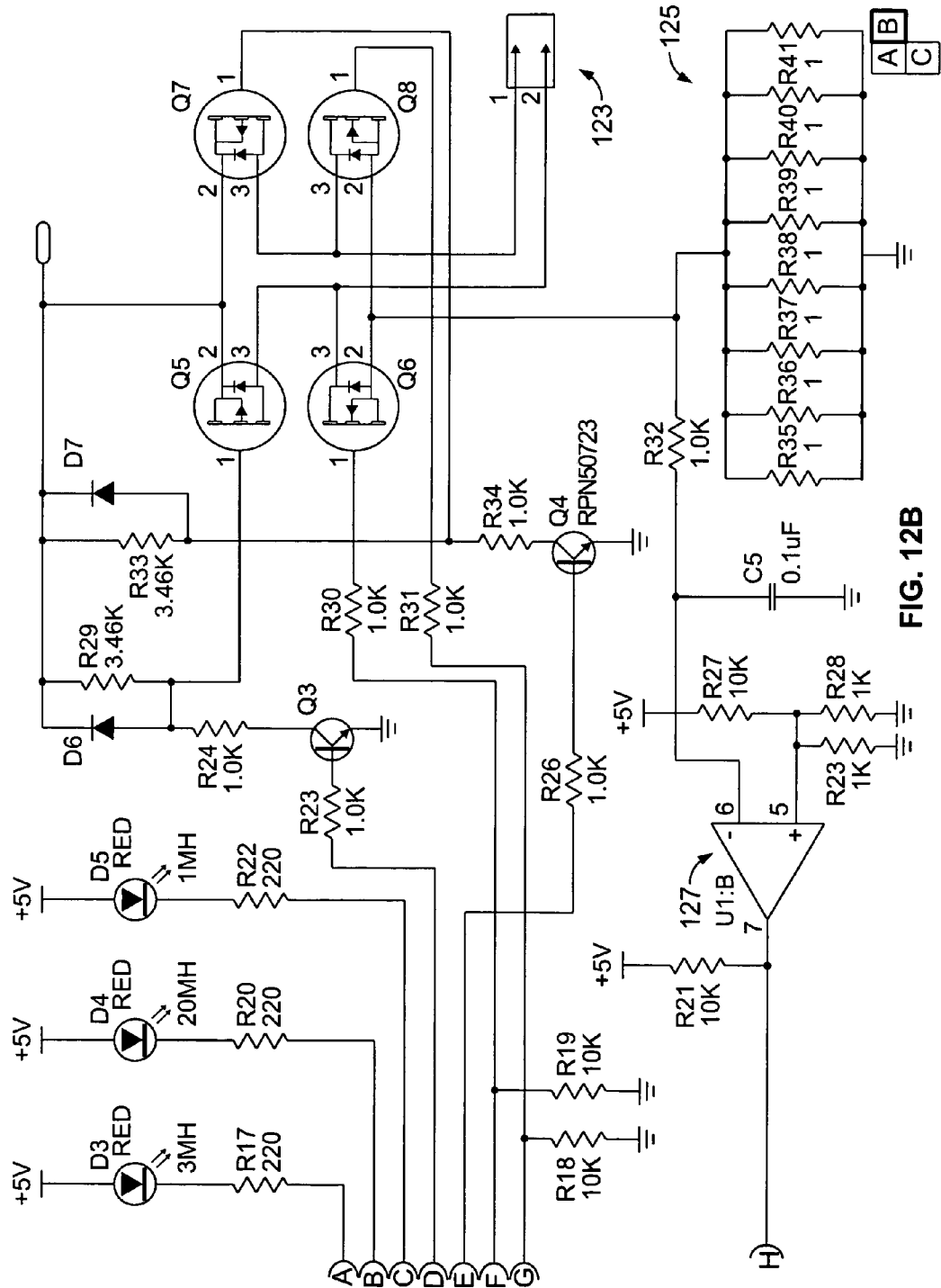
Figure 12C:
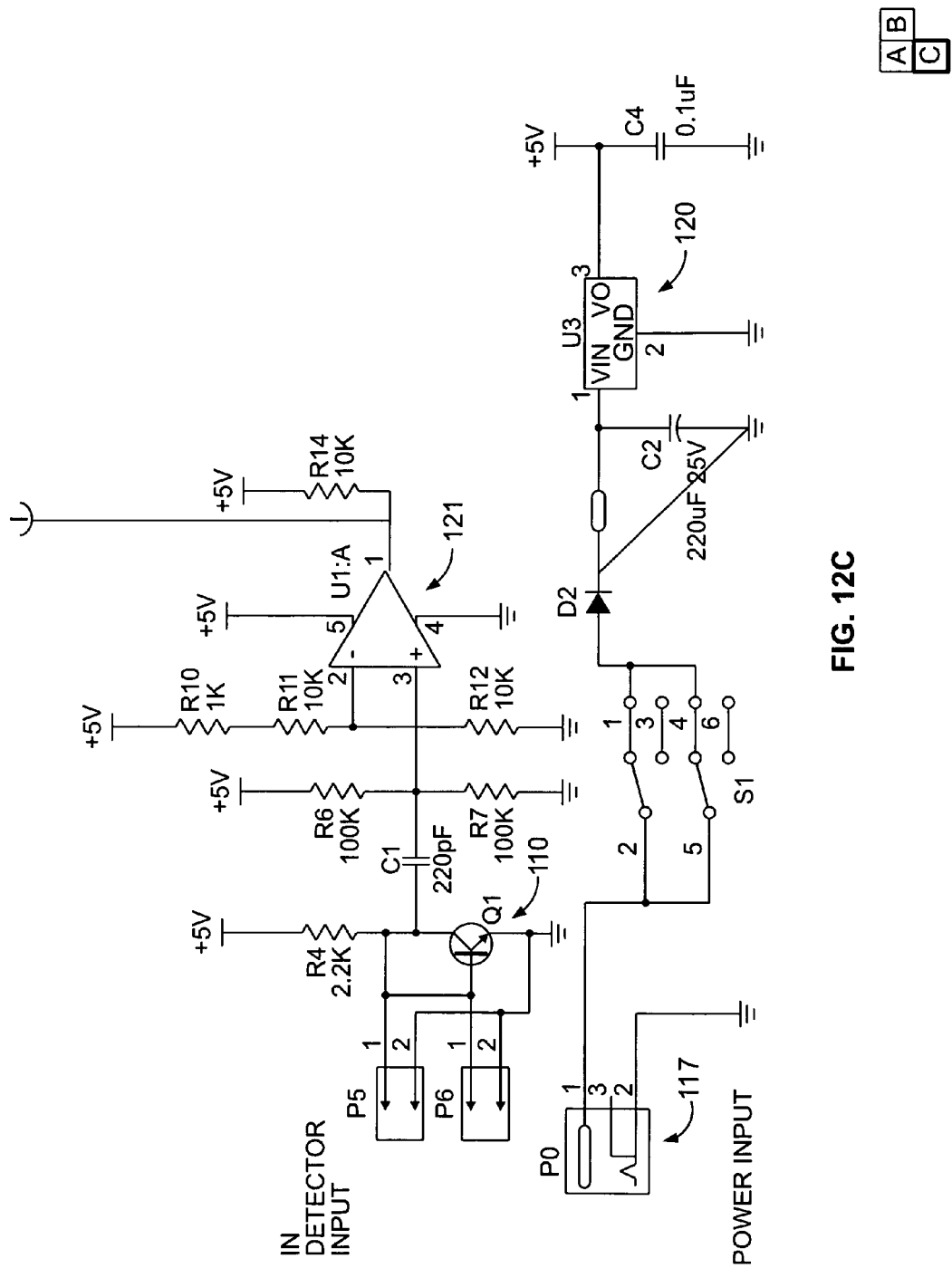

Referring to FIGS. 4 and 12, the exemplary drive assembly 58 includes an electronics board 114 (FIG. 4). The electronics board 114 is used to control the drive motor 71 as well as the infrared emitter 108 and infrared detector 110. Referring to FIG. 12, the electronics board 114 includes a microprocessor 116, for example, an eight bit microcontroller, for example, an Atmel eight bit ADR microcontroller, model no. ATTINY 26L-SC. The power for the microcontroller 116 is provided by a power supply 120, for example, model no. LM340T-5.0-HTOP, as manufactured by National Semiconductor. The power supply 120 provides a +5 volt DC supply that is connected to the VCC/AVCC pins of the microcontroller 116. A bypass capacitor C3 is coupled between the VCC/AVCC pins and ground to stabilize the voltage applied thereto. In particular, a conventional 120 VAC power supply from a receptacle (not shown) may be applied to a power jack 117. The 120 VAC supply, in turn, may be applied to the power supply 120 by way of a switch, for example, a single pole double throw switch S1, coupled in series with a diode D2 which provides half wave rectification of the 120 VAC input supply voltage. The half wave rectified power supply voltage is applied to the input of the power supply 120 which provides a regulated +5 volt DC output. A pair of bypass capacitors C2 and C4 may be coupled across the input and output pins VIN and VO, respectively, and ground to stabilize the voltage applied thereto.

The +5 volt power supply 120 is also used to drive the infrared emitter 108. In particular, the infrared emitter 108 is coupled to the +5 volt power supply 120 by way of current limiting resister R13. The cathode of the infrared emitter 108 is connected to ground by way of a transistor Q2. The base of the transistor Q2 is connected to port PB5 of the microcontroller 116. Normally, the infrared emitter 108 is on continuously. Thus, the transistor Q2 will be continuously turned on by port PB5.

The infrared detector 110 continuously monitors the infrared beam from the infrared emitter 108. The infrared detector 110 may be implemented as a phototransistor Q1. The phototransistor Q1 is coupled between the +5 volt power supply 120 and system ground by way of a current limiting resistor R4. The collector of the phototransistor Q1 is coupled to the non-inverting input of a comparator 121 by way of a coupling capacitor C1. The non-inverting input of the comparator 121 is referenced to a predetermined voltage by way of the +5 volt DC source and a voltage divider, formed from a pair of resistors R6 and R7. As shown, the non-inverting input of the comparator 121 is referenced to +2.5 volts DC. The inverting input of the comparator 121 is referenced to a reference voltage, developed by a plurality of voltage divider resistors R10, R11 and R12 and the +5 volt DC supply. As shown, the reference voltage is 10/21 of +5 volts DC or 2.38 volts DC. The output of the comparator 121 is pulled up to +5 volts DC by way of a pull up resistor R14. Normally, when an infrared beam from the IR emitter 108 is detected by the IR detector (i.e. phototransistor Q1), the phototransistor Q1 conducts, thus connecting the non-inverting input of the comparator 121 to ground. A ground applied to the non-inverting input of the comparator 121 causes its output to be low, which, in turn, is read at port PB3 of the microcontroller 116. When the IR beam is broken, the phototransistor Q1 stops conducting resulting in the non-inverting input of the comparator 121 being pulled up to +2.5 volts DC by way of the pull up resistor 24. The +2.5 volt DC applied to the non-inverting input of a comparator will be greater than the +2.38 volt DC reference voltage applied to the non-inverting input, thus causing the output of the comparator 121 to go high, which is also read by the microcontroller 116 at port PB3.

It is assumed that any time the infrared beam is broken that a cat has entered the litter box. The microcontroller 116 thus initiates a time delay before initiating an automatic cleaning stroke. As shown, the time delay may be user selectable. For example, a switch S3 may be provided. The switch S3 may be a single pole, single throw momentary push button switch. The microcontroller 116 may be programmed to count the number of times that the push button switch is depressed. For example, three user selectable time delays-may be provided. The switch S3 is coupled to port PA0 on the microcontroller 116. This port PA0 is normally maintained at a voltage generated by the voltage divider formed by a pair of resistors R16 and R15, which, in turn, is connected to the output of the half wave rectifier diode D2, identified as HV_IN. As shown, about 1/10 of the voltage HV_IN is applied to the port PA0 of the microcontroller 116 when the switch S3 is open. When the switch S3 is closed, the voltage at the port PA0 is coupled to ground. Thus, each time the switch S3 is depressed, the microcontroller 116 senses a pulse at port PA0. As shown, three exemplary time delays are provided: five minutes; twenty minutes; and one hour. Thus, the switch S3 may be used to select a time delay for initiating an automatic cleaning cycle after the infrared beam is broke. For example, depressing the switch S3 once may be read as a five minute delay, while two depressions of the switch S3 may be read as a twenty minute delay. Finally, three depressions of the switch S3 may be used to indicate a one hour time delay. In order to allow the user to know which time delay has been selected, a plurality of red LEDs D3, D4, and D5 may be provided. These LEDs D3, D4, and D5 are connected to ports PA1, PA2, and PA3 of the microcontroller 116 by way of a plurality of current limiting resistors R17, R20 and R22, respectively and to the five volt supply. Thus, the user, can depress the switch S3 and watch the LEDs D3, D4, and D5 until the desired time delay has been selected.

The drive motor 71 (FIG. 4) is driven by four power FETs Q5, Q6, Q7 and Q8. The voltage available at the output of the half wave rectifier D2, identified as HV_IN, is applied to the source terminals of the power transistors Q5 and Q7 which are normally off. The drain terminals of the power transistors Q5 and Q7 are tied to the drain terminals of the power transistors Q6 and 08 which are normally on. The drain terminals of the power transistors Q5 and Q7 are also applied to a motor output jack 123 which are used to connect to the drive motor 71.

The gate terminals G for the normally off transistors Q5 and Q7 are driven by the half wave rectified voltage for HV_IN by way of a pair of resistors R29 and R33. The resistors R29 and R33, in turn, are serially coupled to a pair of collector resistors R24 and R34, respectively. The collector resistors R24 and R 34, in turn, are coupled to the collectors of a pair of transistors Q3 and Q4 whose emitters are coupled to ground. The bases of the transistors Q3 and Q4 are driven by OUT_H1_1 and OUT_H1_2 signals, available at ports PA4 and PA5 of the microcontroller by way of current limiting resistors R23 and R26 respectively.

Zener diodes D7 and D8 are connected in parallel with the resistors R29 and R33, respectively. These Zener diodes D7 and D8 are used to limit the voltage applied to the collectors of the transistors Q5 and Q4 to, for example, 10 volts.

The gates of the normally off transistors Q6 and Q8 are driven by signals OUT _LO_1 and OUT_LO_2, available at the output of ports PA6 and PA7 of the microcontroller 116. The ports PA6 and PA7 are normally pulled down by pull down resistors R18 and R19.

The serial combination of transistors Q5 and Q6 are used to drive the drive motor 71 in one direction while the serial combination of the transistors Q7 and Q8 are used to drive the drive motor 71 in a reverse direction. The limit switches 94 and 95, are normally pulled up to +5 volts DC by way of pull up resistors R1 and R2 and applied to ports PB0 and PB1 of the microcontroller 116. The limit switches 94 and 95 may be provided with normally open contacts. Thus, when either limit switch is closed, a +5 volts DC is applied to the ports PB0 and PB1. When, for example, the limit switch 94 is closed indicating that the rake assembly 56 is at one end of the litter box 50, the port PB0 is driven low. The low output is sensed by the microcontroller 116, which, for example, generates the signals OUT_H1_1 and OUT_L0_1 signals to cause the transistors Q5 and Q6 to conduct. During this condition, the transistors Q7 and Q8 are non-conducting. The rake assembly 56 is driven along the litter box 50 until the other microswitch 95 is tripped. When the microswitch 95 is tripped, the transistors Q7 and Q8 are used to drive the drive motor 71 by way of the signals OUT_H1_2 and OUT_L0_2.

Irrespective of the direction of rotation of the electrical motor 71, the current therethrough is sensed by a plurality of current sense resistors R35-R42. These current sense resistors R35-R42 form a voltage divider with a resistor R32, which, in turn, is connected to an inverting input of a comparator 127. A capacitor C5 is also coupled between the inverting input and ground to stabilize the voltage across the inverting input. A reference voltage is applied to the non-inverting input of the comparator 127. The reference voltage is developed by the +5 volt DC source and a voltage divider formed by a plurality of resistors R25, R27 and R28. The output of the comparator 127 is pulled high by way of a pull up resistor R21. Thus, the output of the comparator 127 is normally high and sensed by port PB6 of the microcontroller 116. Whenever, the current through the current sense resistors exceeds a predetermined value, for example, 1.9 amperes, the output of the comparator 127 goes low indicating a locked rotor condition for a predetermined period of time indicative, for example, of the rake assembly 56 being stuck against an obstacle such as a cat.)

As mentioned above, the tines 64 rest below the litter level. In embodiments configured for a disposable litter tray 20, a push button S3, for example, a momentary, single pole, single throw push button may be provided. The push button 53 is pulled high by a pull up resistor R9 and sensed by port PB5 of the microcontroller 116. Any time the push button S2 is depressed, the system automatically causes the rake assembly 56 to move out of the way to facilitate removal of the old disposable tray and insertion of a new disposable tray. A limit switch 129 may be provided at one of the litter box 50. The limit switch 129 may be a momentary, single pole, single throw switch. The limit switch 129 is pulled high by a pull up resistor R3 and sensed by port PB2 of the microcontroller 116. The limit switch 129 is used to cause the rake assembly 56 to return to a home position after a new disposable litter cartridge has been inserted.

Figure 13A:
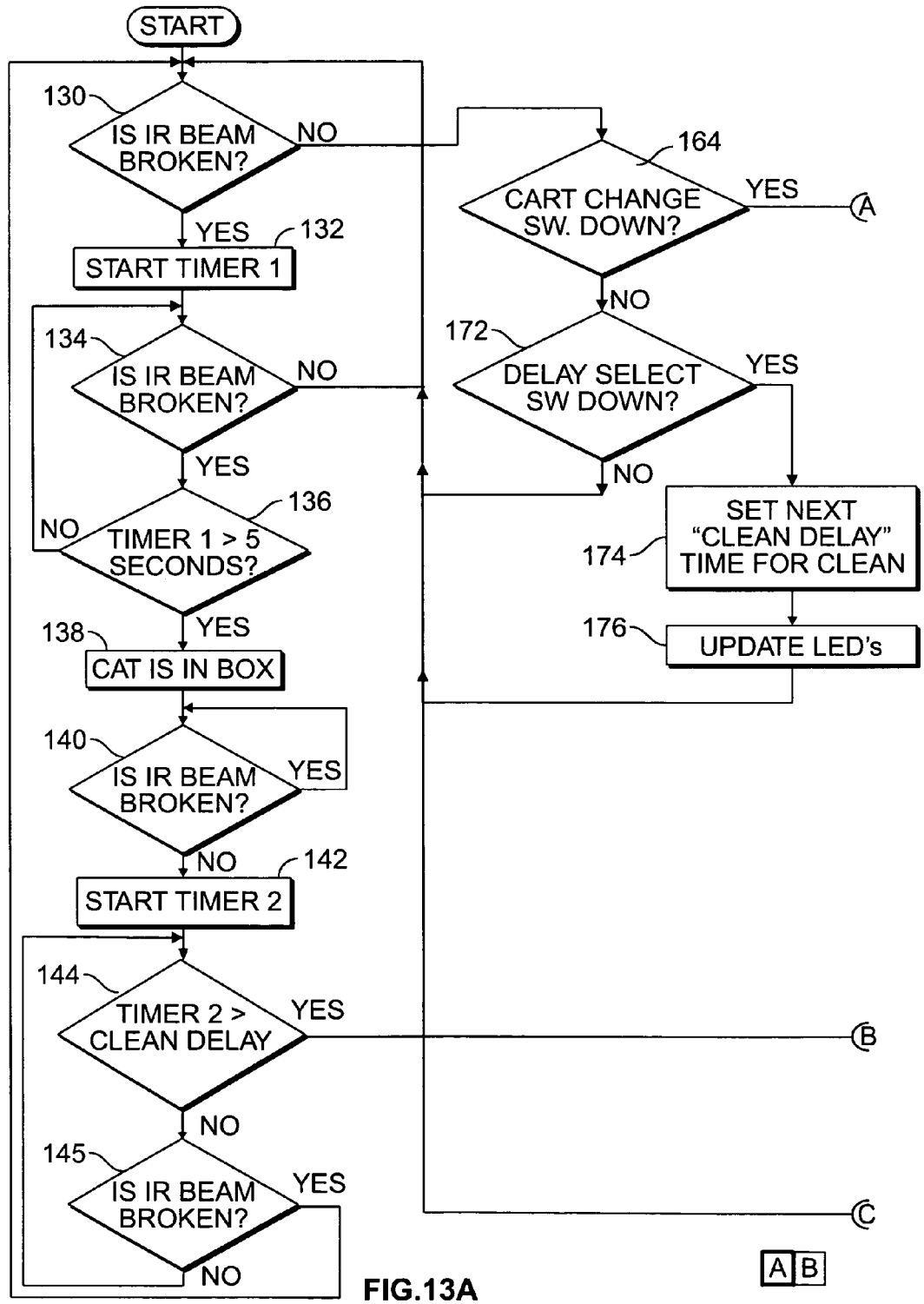
FIG. 13 is a flow diagram for the control system for the self-cleaning litter box illustrated in FIG. 2.
Figure 13B:
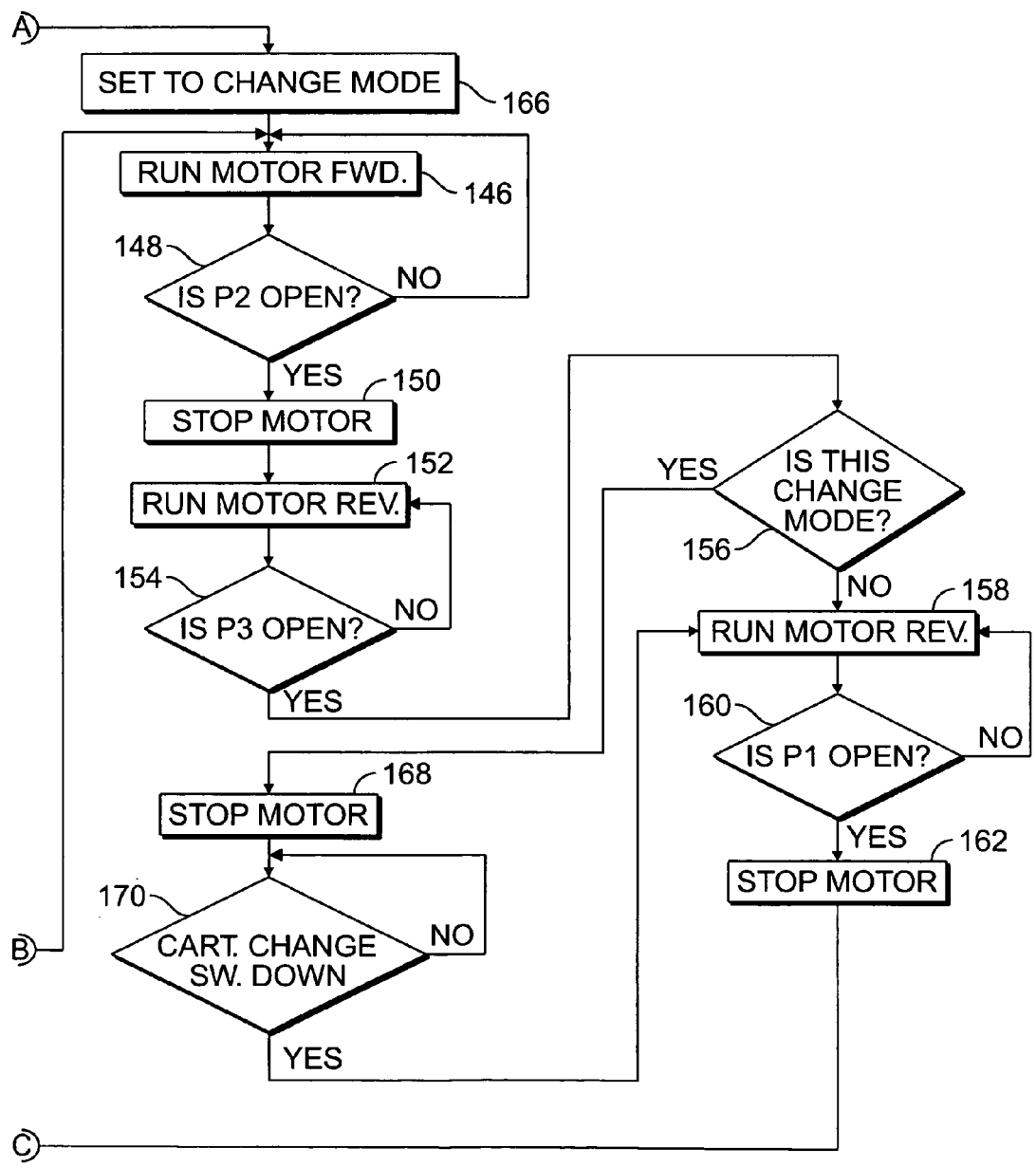

FIG. 13 is an exemplary diagram of the control logic for controlling the drive assembly 58. Initially, the system continuously loops and checks whether the infrared beam is broken between the infrared emitter 108 and infrared detector 110 in step 130. The system loops in this state until the beam is broken. Once the infrared beam is broken, a timer 1 is started in step 132. The system again checks in step 134 to determine if the infrared beam is broken. If not, the system loops back the step 130. If the timer has timed out, as indicated in step 136, the system assumes that a cat is in the box in step 138. If not, the system loops back to step 134 and continuously checks whether the infrared beam is broken. Once it is determined that the timer one has timed out and a cat is in the box, the system checks in step 140 to determine if the infrared beam is broken again. If so, the system loops back to step 138. If not, the system assumes that the cat has left the box and initiates a timer 2 in step 142. As discussed above, the system initiates a user selectable time out period, identified herein as "CLEAN DELAY". Once the time out period of the CLEAN DELAY is complete, as indicated in step 144, the system initiates a cleaning stroke in step 146. If not, the system loops back to step 145. The system continuously checks in step 148 to determine whether the cleaning stroke is complete by checking the position of the limit switch 94 in step 148. Once the cleaning cycle is complete, the system stops the drive motor 71 in step 150. After the drive motor 71 is stopped its direction is reversed in step 152. The drive motor 71 runs in reverse until the system detects that the cartridge change limit switch 129 has been tripped in step 154. The cartridge change limit switch 129 is disposed at a location between the limit switches 94 and 95. When the cartridge change mode has not been initiated as determined in step 156, the drive motor 71 is continued to be run in reverse as indicated in step 158 until the limit switch 95 is tripped. When the limit switch 95 is tripped as determined in step 160, the drive motor 71 is stopped in step 162. After the cleaning cycle is complete, the system loops back to step 130.

As mentioned above, the system includes a switch S2 (FIG. 12) used to reposition the rake assembly 56 to facilitate removal of the disposable cartridge 20. As such, the system checks in step 164 to determine whether the cartridge removal switch S2 has been depressed. If so, a change mode flag is set in step 166. Once the change mode flag is set, the rake assembly 56 is cycled through a cleaning stroke in steps 146-150. During a cleaning stroke, the rake assembly 56 is guided by the lower track 92 (FIG. 3) in the siderails 52. In order to raise the rake assembly 56, the direction of the drive motor is reversed in step 152 to position the rake assembly 56 in the upper track 90, thus raising the tines 64 upwardly. The rake assembly 56 continues in a reverse direction until the cartridge change limit switch 129 is tripped, as determined in step 156. Once the limit switch 129 is tripped, the drive motor 71 is stopped in step 168 to enable the user to replace the disposable cartridge 20 (FIG. 1). The system then waits in step 170 until the cartridge change switch S2 (FIG. 12) is again depressed which causes the system to return the rake assembly 56 to a home position. In particular, the system repeats steps 158-162.

As mentioned above, the time delay for initiating a cleaning cycle may be user selectable. As such, the system checks in step 172 to determine if the time delay selection switch S3 (FIG. 12) has been depressed. If so, the selected time delay is acknowledged by the system in step 174 and the appropriate LED is updated in step 176. If it is determined in step 144 that the second timer has not timed out, the system checks in step 150 to determine if the infrared beam is broken. If so, the system loops back to step 138 and assumes that a cat is again in the litter box. If not, the system loops back to step 144 and awaits time out of the 60 second timer.

FIGS. 5-11 illustrate the various positions of the rake assembly 56. For example, FIGS. 5A and 5B illustrate the position of the rake assembly 56 at a position at the beginning of the cleaning stroke. FIGS. 6A and 6B illustrate an intermediate position of the rake assembly 56 during the cleaning stroke. FIGS. 7A and 7B illustrate the end of the cleaning stroke. FIGS. 8A and 8B illustrate a position in which the lifting arm 102 lifts the cover 34 over the waste compartment 24. FIGS. 9A and 9B illustrate a dumping position in which the extending ends of the tines 64 are disposed within the waste compartment 24 of the litter cartridge 20. In this position, solid waste materials as well as clumped litter collected by the tines 64 are deposited into the waste compartment 24. After the dumping position the drive assembly 58 returns to the position as shown in FIG. 8B. The rake assembly 56 then returns to the far end of the litter box 50 with the tines 64 and lift arm 112 raised defining an intermediate backstroke position shown in FIGS. 10A and 10B. FIGS. 11A and 11B illustrate the position of the rake assembly 56 at the end of the backstroke position.

Tine Configuration

In one embodiment of the invention, the configuration of the tines 64 allows the litter box 50 to be used with crystal litter as well as clumping litter. In particular, the configuration of the tines 64 allows the rake assembly 56 to move through the crystal litter with a minimum wave and thus electrical power. In particular, the configuration of the tines 64 provides a wedge action as the tines 64 move through the crystal litter, lifting the litter up and allowing it to fall back through the tines 64 as the rake assembly 56 moves forward. The tine configuration also supports recirculation of the litter to redistribute the litter thus enabling more effective wicking away of liquid waste and moisture.

Each tine 64 may be formed from cylindrical steel wire, for example 16 AWG, which has a much higher stiffness than plastic and further allows the use of smaller diameter cross sections, that is critical to reducing drag through the crystal litter. The round cross section also has a much smaller surface area than a more aerodynamic shape which facilitates moving through crystal litter. Also each pair of tines 64 may be made up of a single piece of wire bent into a U-shape. The U-shape eliminates sharp ends on the rake proving rounded, smooth ends that protect the user and cat. In addition, the tines 64 are formed to be flexible which reduces drag by causing the tines to flex as it moves through the crystal litter. During a cleaning stroke, the tines 64 flex back and forth and side to side to facilitate movement through crystal litter. Moreover, as best shown, for example in FIG. 5B, the rake tines are formed with two legs 104 and 106. The leg 106 is bent between 10° and 60° relative to the straight leg 104, preferably 45°. Alternatively, the rake tines can have one leg 106, in which case the tine angle is between 10° and 60°, preferably 45°. In both cases, the rake tine angle is tipped back with respect to the direction of travel of the rake assembly The spacing between each of the tines 64 may be 3-20 mm. In particular, each pair of tines 64 may be formed by bending a length of wire into a U-shape having a bend radius of 1 to 5 mm, with two extending tines spaced 10 mm apart, preferable for crystal litter particles that are 4-5 mm in size. Each U-shaped pair of tines is spaced 10 mm from an adjacent U-shaped pair of tines. The spacing between the tines is selected as a function of the maximum particle size of the litter, both for crystal and non-crystal litter types. For example, the spacing between the tines may be selected to be slightly larger than the maximum particle size of the litter to some multiple of the maximum particle size of the litter. A given sample of litter will have a distribution of particle sizes, with a defined maximum. In sizing the tine spacing with respect to the litter particle size, a balance is achieved which allows the rake to pass through the litter easily yet still allow the rake to redistribute and mix the litter after a cat has disturbed the litter bed by digging and piling the litter non-uniformly. If the tine spacing is too small with respect to the litter particle size, the rake cannot easily flow trough the litter and excessive plowing occurs. The same problem results if the rake back angle is too small for a given tine spacing and litter particle size. However, If the rake tine spacing is too large, then the rake does not adequately capture and remove solid cat waste. Also, if the tine spacing is too large with respect to the litter size, then the litter is not adequately redistributed after being disturbed by a cat. Through appropriate election of tine spacing and tine back-angle, various size litters can be accommodated. For example, for crystal litter with a particle size distribution of 2-5 mm, a tine spacing of approximately 10 mm and a back-angle of 45° achieves good mixing and redistribution, permits rake travel through the litter with low electrical power and with limited wave and plowing of the litter to one side of the bed, and permits the rake to capture and remove all or most of the solid cat waste deposited into the litter bed.

Contamination Protection

In accordance with an important aspect of the invention, a portion of the drive assembly 58, including the electric motor 71, extending shafts 76, 78, couplings 80, 82 and worm gear assemblies 84 and 86 is mounted stationary in a separate housing 61 (FIG. 2) adjacent one end of the self-cleaning litter box 50. Such a configuration protects this portion of the drive assembly 58 from contamination. In addition, as discussed above, the lead screws 72 and 74 are disposed in slots 90 and 92 in the side rails 52 and 54. Although not shown, the slots 90 and 92 are covered with either a plastic roof extending over the side rail or a side cover that completely shields the drive assembly 58 by way of a labyrinth seal. In an alternate embodiment of the drive mechanism shown in FIGS. 19-24, a top housing provides a labyrinth seal, generally identified with the reference numeral 201, along the full length of travel of the rake assembly, protecting all drive elements from contamination by litter and waste. This is best shown in FIG. 17D.

In addition, as best shown in FIG. 3, the micro-switches 94 and 95 are disposed in cavities 97 and 99 in the side rails 52 and 54 as discussed above. As such, unlike known self-cleaning litter boxes, the drive assembly 58 in accordance with the present invention is protected from contamination.

Alternative Embodiment

An alternative embodiment of the self-cleaning litter box in accordance with the present invention is illustrated in FIGS. 16-27 and identified with the reference numeral 200. As shown, the self-cleaning litter box 200 includes a top housing 202, a pivotally-mounted system lid 204 and a litter tray 206. As will be discussed in more detail below, the litter tray 206 may be disposable and non-compartmentalized.

Figure 16:
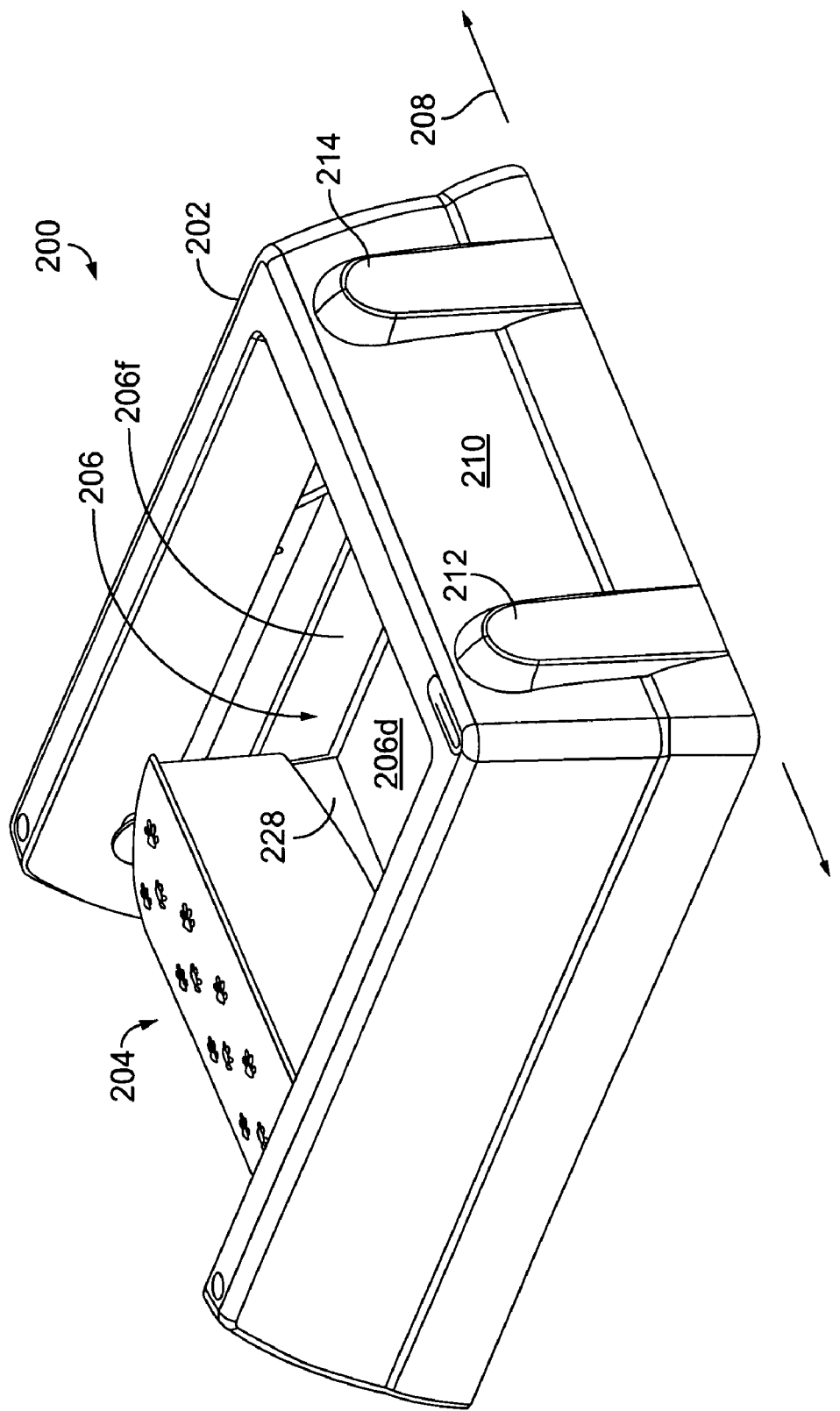
FIG. 16 is an isometric view of an alternate embodiment of the self-cleaning litter box in accordance with the present invention.
Figure 18B:
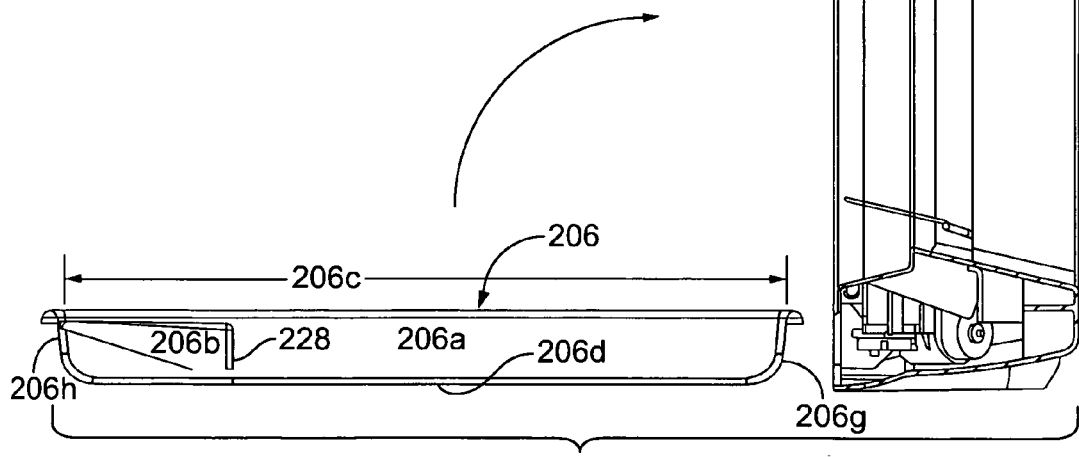
FIG. 18B is a sectional view of the litter box in the position illustrated in FIG. 18A.

In accordance with one aspect of the alternative embodiment of present invention, the litter tray 206, which may be disposable, forms the bottom floor of the self-cleaning litter box 200 without any mechanical coupling thereto. Such a configuration greatly facilitates removal and reinsertion of the litter tray 206 into the self-cleaning litter box 200. More particularly, as best shown in FIGS. 17A and 18A, the self-cleaning lifter box 200 sits on the floor and surrounds the litter tray 206. Thus, in order to remove the litter tray 206, the self-cleaning litter box 200 is simply lifted upwardly, for example, as illustrated in FIGS. 18A and 18B, for example, about an axis 208 (FIG. 16). Alternatively, the self-cleaning litter box 200 may be lifted straight up.

Such a configuration also helps maintain cleanliness of the litter box in that the litter box is above the litter tray and can have surfaces extend over the edges of the tray so that all waste, scattered litter, or misdirected cat urine is directed back into the tray. Vertical removal of a tray would not allow overhanging surfaces, would require the rake to have a motorized park position and would require more cumbersome user actions to grab the lip of the cartridges for vertical removal. Side removal of the tray would require a larger work area and floor space for cartridge removal. Thus, lifting the litter box as illustrated in FIGS. 18A and 18B is advantageous.

In one embodiment of the invention, as shown in FIG. 16, one panel 210 of the housing 202 may be formed with a pair of spaced-apart feet 212 and 214. These spaced-apart feet 212, 214 are configured so that the self-cleaning litter box 200 is supported in a vertical position (i.e., 212 and 214 squarely on the ground) as generally shown in FIGS. 18A and 18B. Since the litter tray 206 is not mechanically coupled to the self-cleaning litter box 200 and simply sits on the floor, once the self-cleaning litter box 200 is lifted or placed on end, as shown in FIGS. 18A and 18B, the litter tray 206 may simply be removed and replaced with a new litter tray 206. After a new litter tray 206 is placed on the floor, the self-cleaning litter box 200 is then placed in a position on the floor such that the outer housing 202 surrounds the litter tray 206, as generally shown in FIGS. 17A-17C.

By removing the litter cartridge as described above, the rake assembly does not have to be removed from the litter area by motorized means to a park position out of the litter as in the embodiment illustrated in FIGS. 1-15.

In the embodiment illustrated in FIGS. 16-24, the rake tines may remain in the litter at all times at one level in the home position, allowing a simplification of the drive mechanism and controller that controls the rake assembly. Furthermore, the user actions required to remove the cartridge are simplified, as the user does not have to command the rake to travel into and out of a park position that is distinct from the normal home position.

Turning to FIG. 19, an exploded perspective view of the self-cleaning litter box 200 along with the litter tray 206 is illustrated. The self-cleaning litter box 200 includes the top housing 202, a chassis assembly 216, a drive assembly 218, a lift arm 220, a system lid 204 a rake assembly 222; and a controller 310 (FIG. 32). The drive assembly 218 is used to drive the rake assembly 222 from a home position 224 FIG. 20) adjacent the end panel 210 (FIG. 16) to a waste position 232 (FIG. 20), adjacent the system lid 204. In particular, as will be discussed in more detail below, the rake assembly 222 (FIG. 19) is periodically cycled. During a forward stroke in the direction of the arrow 226 (FIGS. 27A and 27B), from the home position 224 toward the waste position 232, the rake assembly 222 is configured to be at a negative angle $\Theta$ relative to the vertical to permit raking through large particle size litter and to minimize the drag on the rake assembly 222 during a forward stroke. As the rake assembly 222 advances during a forward stroke, solid waste in the litter is raked toward the waste position 232.

As the rake assembly 222 advances towards the waste position 232, the drive assembly 218 engages the lift arm 220 causing the system lid 204 to rotate upward (FIGS. 22A-22C, 27A and 27B). On a return stroke, as indicated by the arrow 234 (FIGS. 27C and 27D), the drive assembly 218 reverses direction, as discussed below, causing the rake assembly 222 to flip (I.e. rotate in a counterclockwise direction) so that the rake assembly 222 is at a positive angle Θ with respect to the vertical axis.

In accordance with one aspect of the invention, the litter cartridge 206 may be provided with a tray lid 228 (FIG. 19). More particularly, the litter cartridge 206 defines a waste end 232 that may be provided with a hinged cover 228. The hinged cover 228 is used to cover the waste material, providing improved odor control, protection of the litterbox system lid from contamination, and providing a clean area for the user to grab the cartridge upon removal for disposal. As discussed below, the cover 228 may be formed with a living hinge and include a magnetically attractive plate 236 or formed from magnetically attractive material that cooperates with the one or more magnets disposed on the underside of the system lid 204. The tray may also be provided with a large cover which covers the entire surface of the tray. This cover contains litter during shipment, stiffens the cartridge for easy handling, and facilities disposal of a used cartridge.

The system lid 204 and the tray lid 228 may be magnetically coupled together so that when the system lid 204 rotates upward, the tray lid 228 likewise rotates upward. Alternatively, various mechanical coupling methods are contemplated for coupling the system lid 204 and the tray lid 228. For example, a loop of elastic cord secured on one end to the tray lid 228 can be looped over an extending pin (not shown) formed in the system lid 204 by the user. Various other means may also be used to couple the system lid 204 and the tray lid 228, such as clips, tapes, latches and the like.

The magnetic coupling allows the self-cleaning litter box 200 to be quickly and) easily decoupled and separated from the litter tray 206. In particular, the system lid 204 may be provided with a magnet 207 (FIG. 27C) on its underside. The tray lid 228 may be provided with a magnetic material 236 and positioned to be aligned with one or more magnets carried by the system lid 204 when the litter tray 206 is registered within the self-cleaning litter box 200. As such, when the system lid 204 rotates upwardly, the magnetic attraction will cause the tray lid 228 to rotate in the same direction. The strength of the magnet 207 is sized so that the system lid 204 is easily magnetically decoupled from the tray lid 228 when the self-cleaning litter box 200 is being picked up or tilted so that the litter tray 206 can be easily removed and replaced.

Figure 27A:
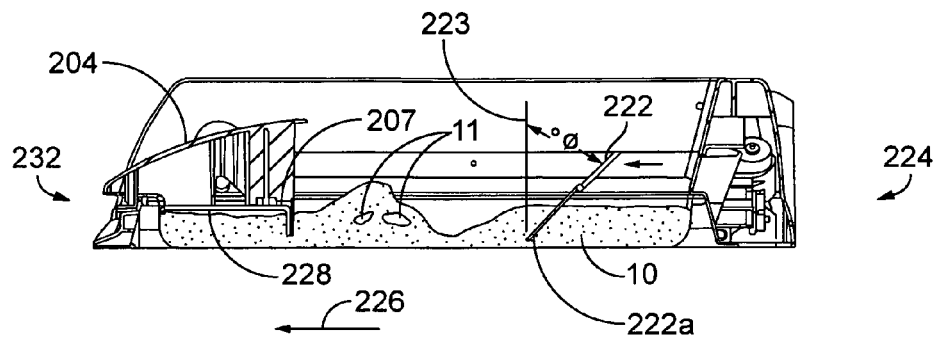
FIG. 27A-D are sectional views illustrating a raking cycle for the self-cleaning litter box in FIG. 16
Figure 27B:
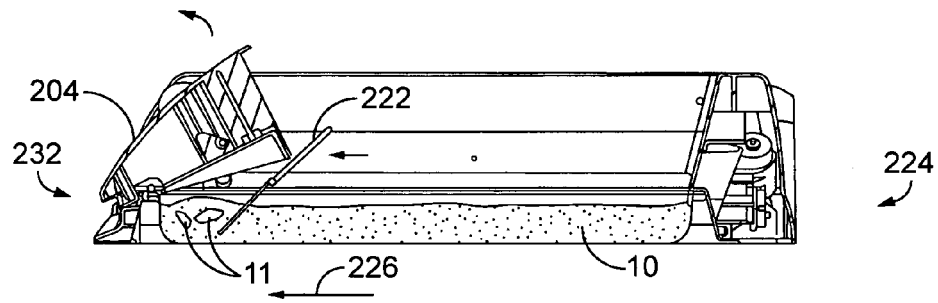

After the system lid 204 and corresponding tray lid 228 on the litter tray 206 are rotated to a position, for example, as shown in FIG. 27B, the rake assembly 222 is able to push the waste as far as possible toward the waste end 232 of the litter tray 206. As the drive assembly 218 reaches the end of travel during a forward stroke in the direction of the arrow 226 (FIG. 27B), the rake assembly 222 rotates in a counter-clockwise direction as the rake assembly 222 travels in a direction of the arrow 234 (FIG. 27C) during a reverse stroke.

Description of the Component Parts of the Alternative Embodiment

Chassis Assembly

Figure 20:
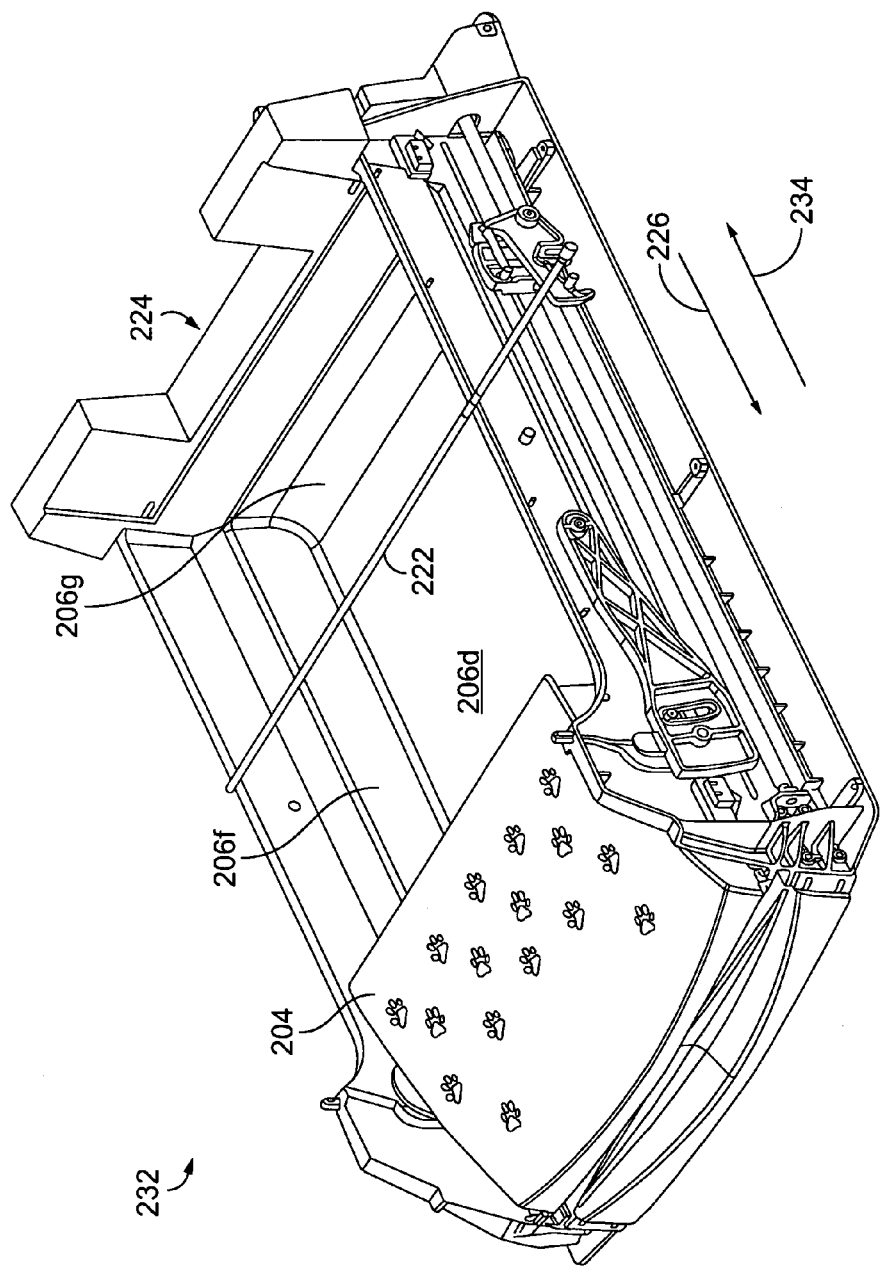
FIG. 20 is an isometric view of the self-cleaning litter box illustrated in FIG. 16, shown with the top housing removed and the drive assembly illustrated in FIG. 19.

Turning to FIG. 19, The chassis assembly 216 includes a pair of spaced-apart side rails 238, 240, connected together on the waste end 232 by a front rail 242. A rear rail 244 is used to connect the side rails 238 and 240 at the home end 224 (FIG. 20). When assembled, the chassis assembly 216 forms an open bottom rectangular structure having a perimeter slightly larger than the perimeter of the litter tray 206.

Drive Assembly

The drive assembly 218 includes a pair of lead screws 246, which are carried by the side rails 238 and 240. One end of the lead screws 246 are carried by a bracket bearing 248 on the waste end 232 and a bearing 250 on the opposing home end 224.

The lead screws 246 form part of the drive assembly 218. The balance of the drive assembly is carried by the rear rail 244. In particular, the rear rail 244 carries a drive motor 252, secured to the rear rail 244, by way of a motor mount 254. A worm 256 cooperates with a worm and pulley assembly 258, to drive one lead screw 246, carried by the side rail 238. A spaced-apart pulley 260, is coupled to the other lead screw 246, carried by the side rail 240.

Figure 28A:
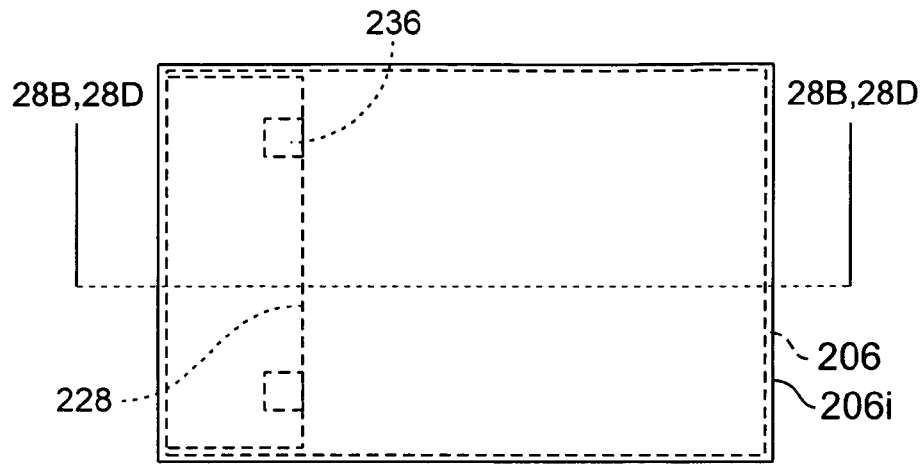
Figure 28B:
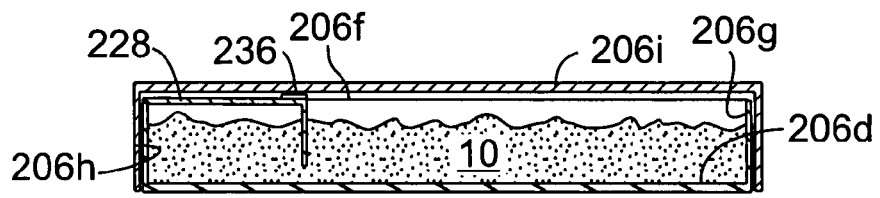
Figure 28C:
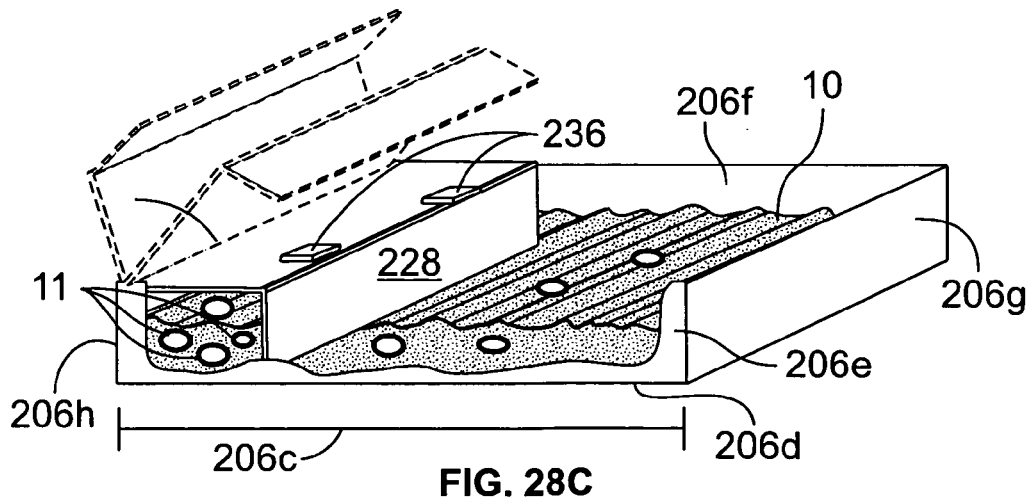
Figure 28D:
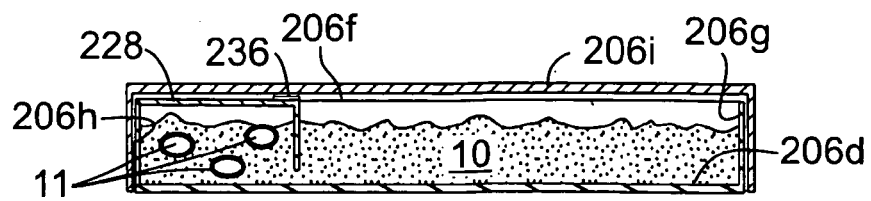

A belt 262 is used to turn the pulley 260 and in turn, the other lead screw 246 on the side rail 240. In one embodiment, a nut follower 264 may be used to couple the rake assembly 222 to the drive assembly 218 to cause the rake assembly 222 to sweep across the litter tray 206 during both a forward and reverse stroke. As will be discussed in more detail below, the drive nut 263 and the nut follower 264 are mechanically coupled together by way of a tilt arm 296 (FIG. 26B) and a biasing spring 308 (FIG. 28B).

Lift Arm

Figure 22A:
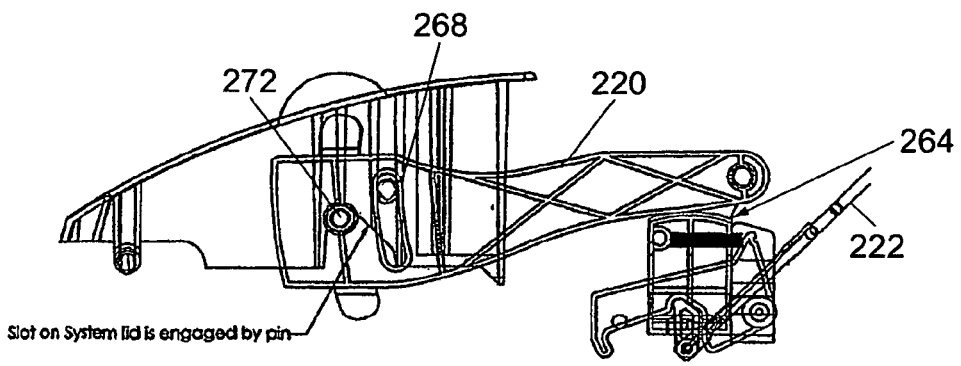
FIG. 22A-C are partial views of the system illustrated in FIG. 21 with the side rail removed to illustrate elements of the lifting mechanism of the system lid
Figure 22B:
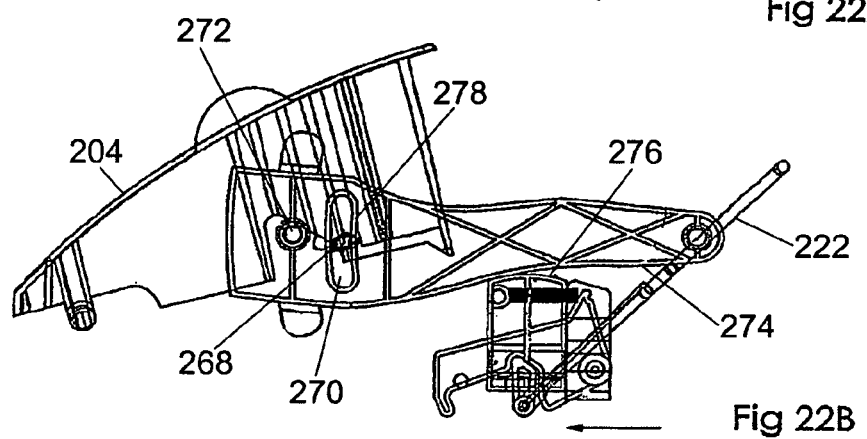
Figure 22C:
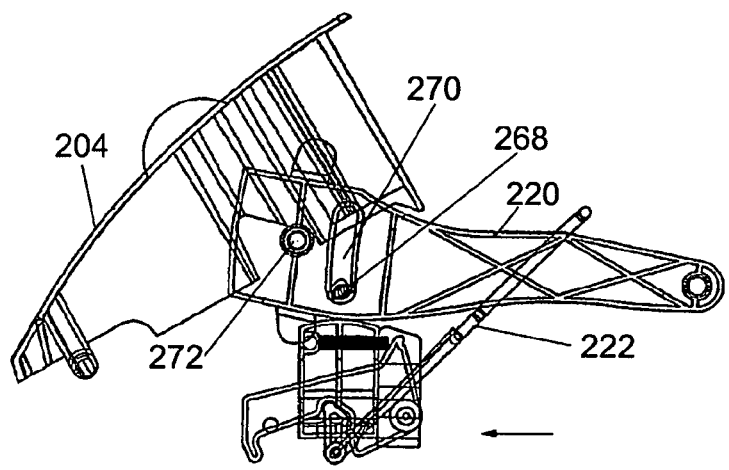

Turning to FIGS. 22A-C, the lift arm 220 is used to lift the system lid 204 as the rake assembly 222 approaches the waste end 232. More particularly, as the nut follower 264 advances in a forward stroke towards the waste end 232, the lift arm 220 is caused to lift which, in turn, rotates the system lid 204 in a counter-clockwise direction as shown in FIGS. 22B and 22C.

As shown in FIG. 21, the lift arm 220 is configured as a lever that is pivotally-connected to the side rail 240 on one end by way of a pin 267. Rotational movement of the lift arm 220 is limited by way of another pin 268 and an elongated slot 270. The elongated slot 270 receives the pin 268 and allows the lift arm 220 to rotate along an arcuate path defined by the slot 270. The lift arm 220 also includes an inwardly projecting pin 272. The pin 272 cooperates with a cam surface 278 (FIG. 22A) formed on the underside of the system lid 204 and is used to control the lifting of the system lid.

As shown in FIGS. 22A-C, as the nut follower 264 advances towards the waste end 232, the lift arm 220 rotates in a clockwise direction causing the system lid 204 to lift and rotate in a counter-clockwise direction. In particular, one portion of the lift arm 220 is formed with a cam surface 274 The cam surface 274 on the lift arm 220 is adapted to engage a cam surface 276 on the nut follower 264. Thus, as the nut follower 264 moves in a direction of the arrow 226 (FIG. 20), the cam surface 276 on the nut follower 264 engages the cam surface 274 on the lift arm 220 causing the lift arm 220 to lift as shown in FIGS. 22B and 22C. The cam surface 274 is shaped to provide a constant rate of lift as the nut follower 264 traverses. As the nut follower 264 continues to move in the direction of the arrow 226 (FIG. 20), the pin 272 advances along the cam surface 278 formed on the underside of the system lid 204. As the nut follower 264 continues to move further in the direction of the arrow 226, the lift arm 220 continues moving upwardly, which causes the system lid 204 to rotate in a counter-clockwise direction. As the nut follower 264 gets to its end of travel during a forward stroke, the lift arm 220 continues to lift, thereby causing the system lid 204 to rotate in a counter-clockwise direction. Since the system lid 204 is magnetically or otherwise mechanically coupled to the tray lid 228, lifting of the system lid also causes lifting of the tray lid 228, as best shown in FIG. 27B. As the nut follower 264 reaches its end of travel position during a forward stroke, an "end" limit switch is tripped, which as discussed below, results in the direction of rotation of the drive motor 252 being reversed. After the direction of the drive motor 252 is reversed, the drive nut 263 reverses direction and travels in the direction of the arrow 234 (FIG. 20) during a return stroke (i.e. from the waste end 232 to the home position 224). When the drive nut 263 reverses direction (i.e. travels in a direction of the arrow 234), the nut follower 264 will also reverse direction because of the mechanical coupling there between, resulting in the lift arm 220 dropping down to its initial position as shown in FIG. 22A, which, in turn, causes the system lid 204 and the tray lid 228 to rotate back to its initial position as shown in FIG. 22A. Continued movement of the nut follower 264 during a return stroke causes a disengagement of the cam surface 276 of the nut follower 264 from the cam surface 274 of the lift arm 220.

Rake Assembly

Figure 27C:
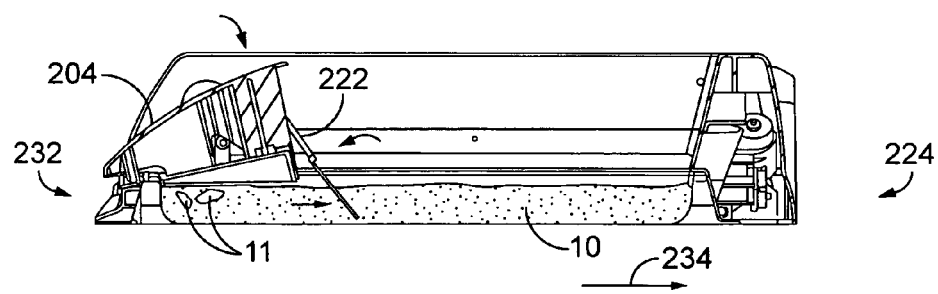
Figure 27D:
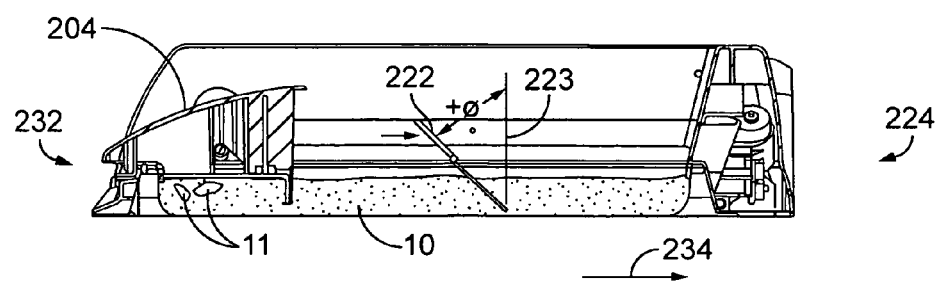

The rake assembly 222 is best shown in FIG. 19. As shown, the rake assembly 222 includes a plurality of tines 284 rigidly secured to a wire frame 286. The wire frame 286 includes a pair of vertical legs 288 and 290. As shown in FIG. 21, for example, the vertical legs 288 and 290 are pivotally coupled to the nut followers 264 on each side of the self-cleaning litter box 200 at a pivot 294 (FIG. 25B). The pivot point 294 allows the rake assembly 222 to pivot about a vertical axis 223 (FIGS. 27A and 27D) plus and minus θ°, for example, plus or minus 45°. In particular, by pivoting the rake assembly 222 at the bottom of the rake assembly 222, linear movement of the rake assembly 222 through the litter causes the rake assembly 222 to pivot, for example plus 45°, during a return stroke 234, as generally shown in FIGS. 27C and 27D, and minus 45°, for example, during a forward stroke 226 relative to a vertical axis 223, as shown in FIGS. 27A and 27B. The amount of rotation is limited by the contact of the rake assembly 222 with the tops of the side rails 238 and 240. Thus, as the rake assembly 222 changes directions, as shown in FIGS. 27B and 27C, the rake assembly 222 flips positions. The rake assembly 222 can also be made to flip at pre-determined locations as seen fit for functional requirements by introducing a resistance anywhere above the pivot point along the length of travel. The configuration of the tines 284 may be as otherwise described above.

The importance of backward angle of the rake tines with respect to travel direction for large size litter such as crystal litter is that it eliminates the wave in front of the rake assembly thus allowing the self-cleaning litter box to be used with crystal litter. Another important benefit of the self flipping rake design is that the rake automatically reverses angle with a change in rake travel direction. This action facilitates raking in both directions, increasing the degree of litter mixing. With better litter mixing, the litter absorbs urine odor better and lasts longer, permitting a longer period of operation before user intervention. Furthermore, the self flipping rake distributes litter evenly in both rake travel directions, preventing a bias of litter to one end of the litter cartridge over time. Furthermore, bi-directional raking with the tines fully disposed into the litter redistributes and levels the litter bed after a cat has disturbed the litter bed by digging and piling of the litter non-uniformly.

Drive Nut and Drive Follower

As mentioned above, the drive assembly 218 (FIG. 19) includes a pair of lead screws 246. The drive assembly 218 also includes a worm 256 coupled to the shaft (not shown) of the motor 252. The worm 256 cooperates with a worm gear 258 which may be either integrally formed or directly coupled to a pulley 258 that is directly coupled to one lead screw 246. A second pulley 260 is directly coupled to the other lead screw 246. A belt 262 couples the two pulleys 258 and 260. A tension arm 291 and tension pulley 292 (FIG. 17) may be used to keep tension in the belt 262. The lead screws 246 are used to drive a drive nut 263 and the mechanically coupled nut follower 264.

As the drive motor 252 (FIG. 19) is energized, the rotation of the drive motor 252 causes rotation of worm 256 and the worm gear 258, which, in turn, drives one lead screw 246 and the pulley 258. The pulley 258 drives the pulley 260 by way of the belt 262. Rotation of the pulleys 258, 260 causes rotation of the other lead screw 246. As the lead screws 246 rotate in a forward direction, the drive nut 263 and the nut follower 264 advance towards the waste end 232 during a forward stroke. As the lead screws 246 rotate in a reverse direction, the drive nut 262 and nut follower 263 travel in reverse in a return stroke back to a home position.

Figure 23A:
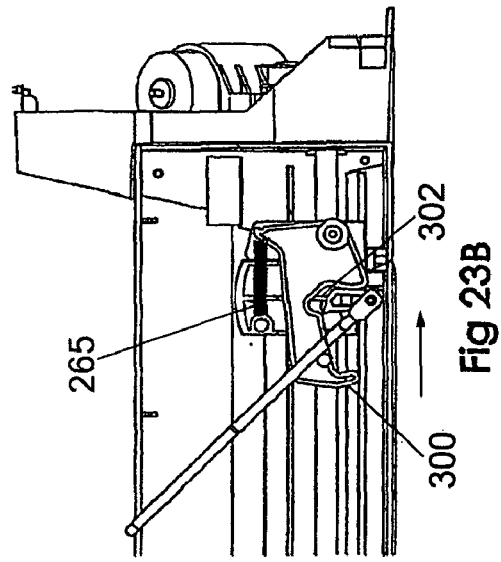
FIG. 23A-D are partial views of the self-cleaning litter box illustrated in FIG. 21 with the side rail removed, illustrating the parking of the rake into home position
Figure 23B:
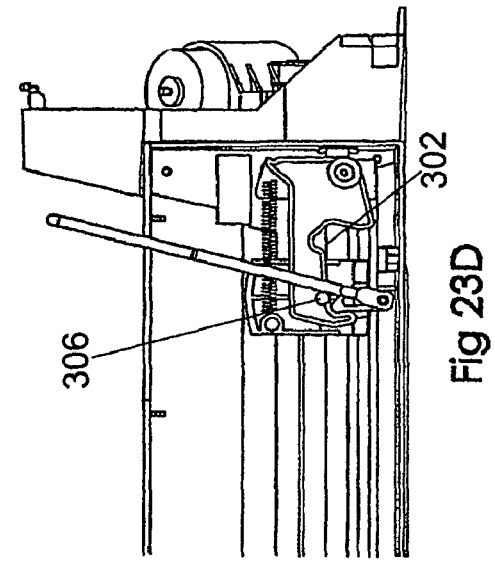
Figure 23C:
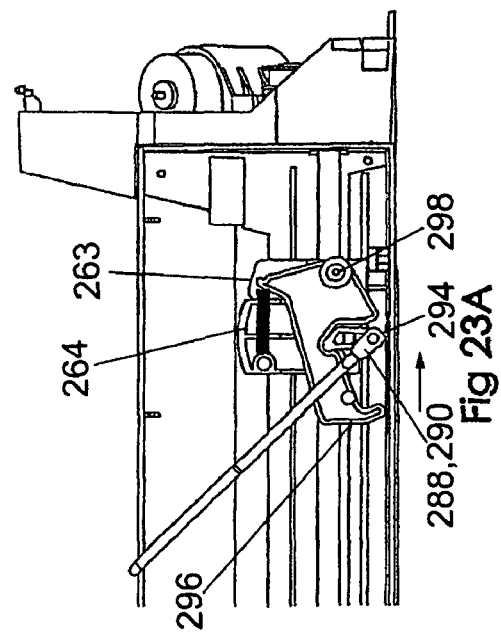
Figure 23D:
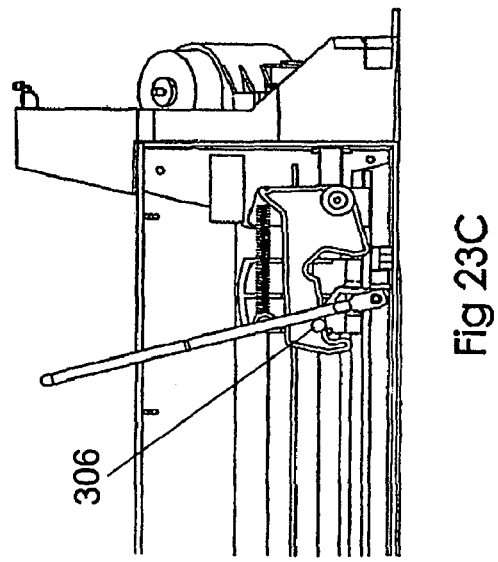

As shown in FIG. 23A, the vertical legs 288 and 290 of the rake assembly 222 are pivotally-connected to the nut follower 264 at one end by way of a pivot 294. A tilt arm 296 is pivotally-connected to the drive nut 263 by way of a pivot 298. The tilt arm 296 is used to disengage nut follower 264 from the drive nut 263, which in turn disconnects the rake assembly 222 from the drive nut 263 as shown in FIGS. 23A-D. The tilt arm 296 includes a hook 300 which cooperates with a cam surface 302, formed in the nut follower 264. More particularly, as shown in FIG. 23A, the hook 300 on the tilt arm 296 engages the cam surface 302 on the nut follower 264 in a normal position to drive the rake assembly 222, for example, as shown in FIG. 23A. As mentioned above, as the drive nut 263 approaches its end of travel in the home position 224 (FIG. 20). A ramp on the tilt arm 296 engages a stop on the side rail and causes the tilt arm 296 to rotate in a clockwise direction, as shown in FIG. 23B. The clockwise rotation of the tilt arm 296 causes the hook 300 to disengage from the cam surface 302 on the tilt arm 296, as shown. As shown in FIG. 23B, a stop 304, formed in the side rail 240 stops further linear travel of the nut follower 264. Continued rotation of the lead screw 246 causes further advancement of the drive nut 263 as well as the tilt arm 296 towards the home position. A pin 306, formed on one end of the tilt arm 296 engages one of the vertical legs 290 of the rake assembly 222 to cause it to rotate in a clockwise direction. Continued movement of the drive nut 263 in a direction of the arrow 234 (FIG. 20) causes the drive nut 263 to advance further to the right, as shown in FIG. 23C. This action allows the rake assembly 222 to stop linear travel and then rotate, minimizing the forces required to place the rake assembly in a home position and reducing the collection of litter behind the rake in the home position A biasing spring 308 that connects the nut follower 264 to the drive nut 263 is biased as the drive nut 263 gets to its end of travel, as shown in FIG. 23C. When the cycle is repeated (i.e., a forward stroke is again initiated), the tension in the biasing spring 308 causes the hook 300 to latch into cam surface 302 of the tilt arm 296.

Flip Arm

Figure 24A:
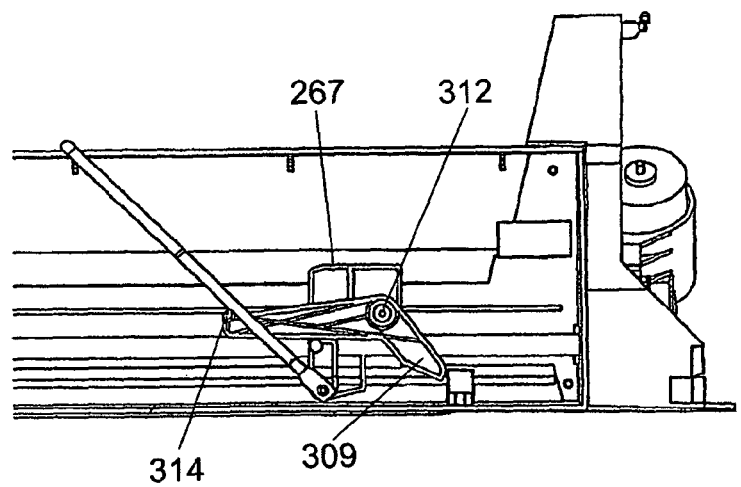
FIGS. 24A-C are partial views of the self cleaning litter box illustrated in FIG. 21 which illustrate rake parking in a home position with an alternative embodiment of the drive assembly.
Figure 24B:
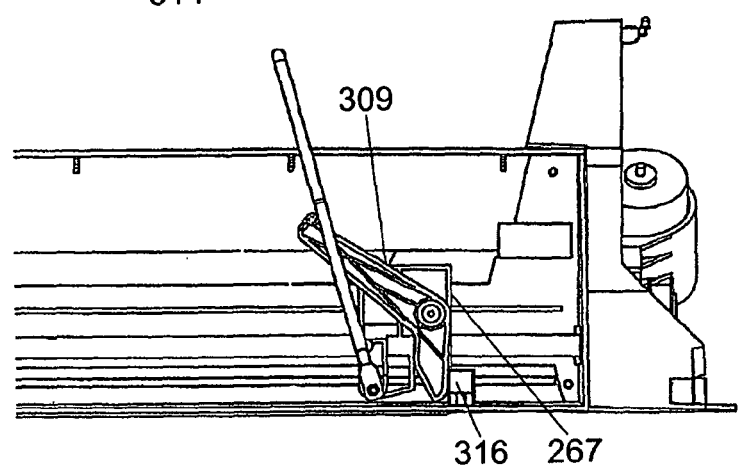
Figure 24C:
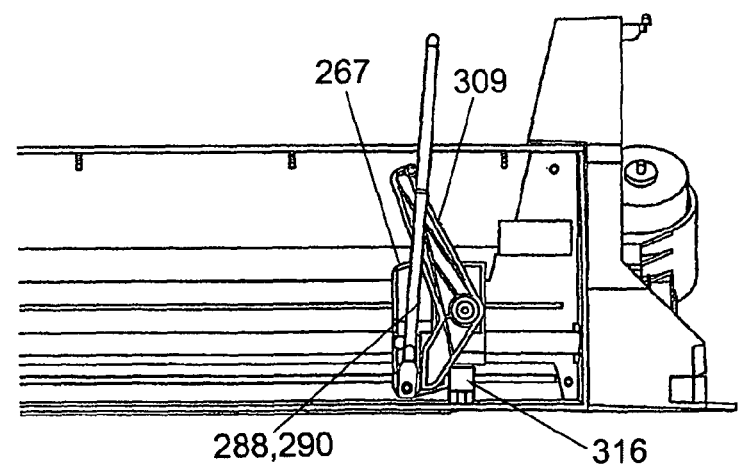

An alternative embodiment of the drive assembly 218 is illustrated in FIGS. 24A-C. In this embodiment, the drive assembly 218 includes a drive nut 267 (without a corresponding nut follower) and a flip arm 309 in lieu of the drive nut 263 and nut follower 264 illustrated, for example, in FIG. 23A. In this embodiment, the vertical legs 288, 290 of the rake assembly 222 are pivotally connected to the drive nut 267 at a pivot point 269. The flip arm 309 is pivotally-connected to the drive nut 267 about a pivot point 312 (FIG. 24A)The flip arm 309, formed as an L-shaped member with a pin 314 formed on one end. During a return stroke, the vertical leg 290 of the rake assembly rests against the pin 314. A stop 316, formed in the side rail 240, engages one end of the flip arm 309. Continued movement in the direction of the return stroke causes the flip arm 309 to rotate about the pivot axis 312. This causes the flip arm 309 to rotate in a clockwise direction. Rotation of the flip arm 309 in a clockwise direction causes the pin 314 to engage the vertical leg 290 of the rake assembly to cause it also to move in a clockwise direction to force the rake assembly to a park position as generally shown in FIG. 24C. The flip arm 309 does not stop linear travel of the rake assembly 222 while the rake assembly 222 rotates.

Controller

Figure 25A:
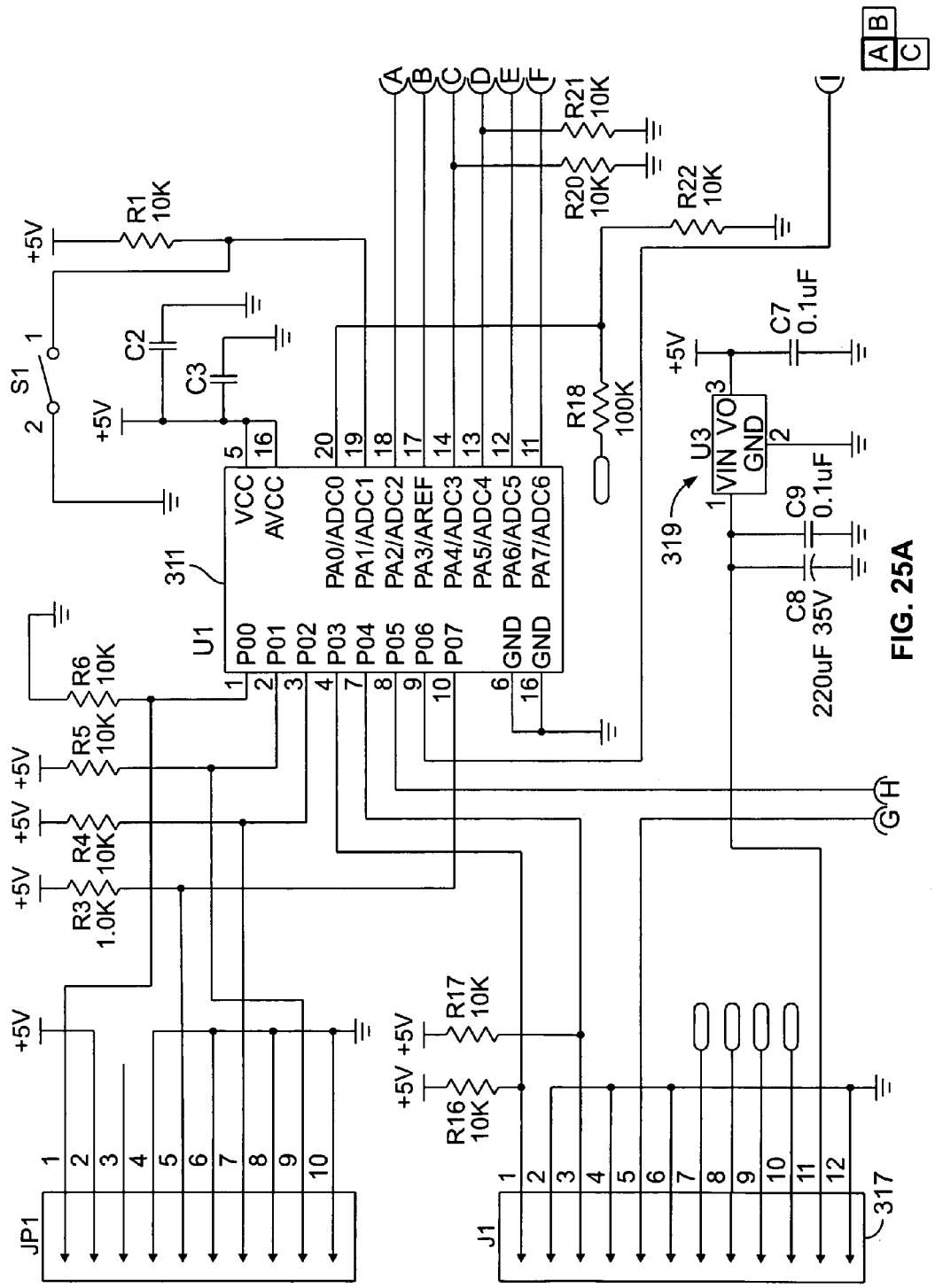
FIG. 25 is an electrical schematic diagram for a controller for use with the embodiment illustrated in FIGS. 16-24 and 27.
Figure 25B:
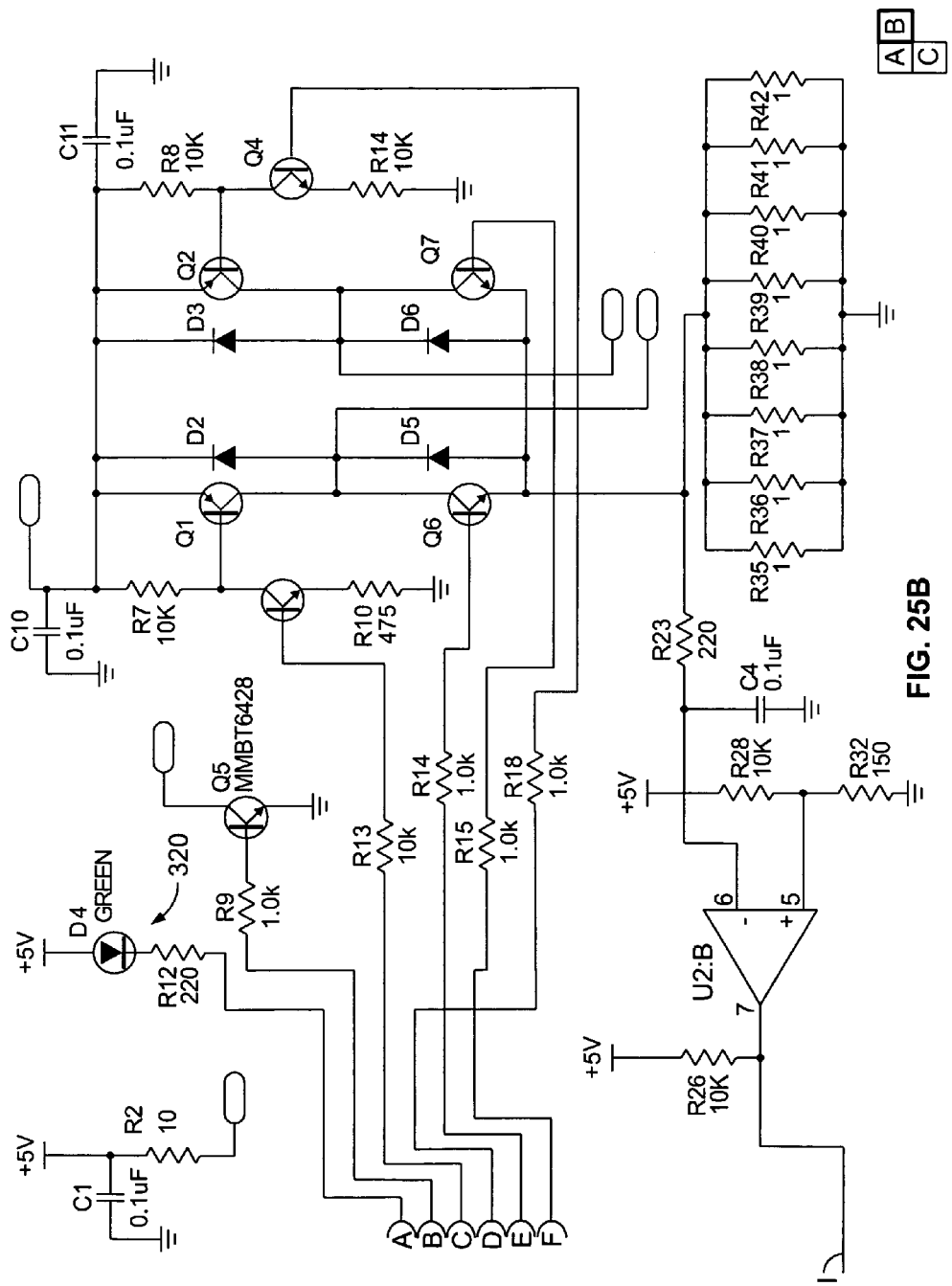
Figure 25C:
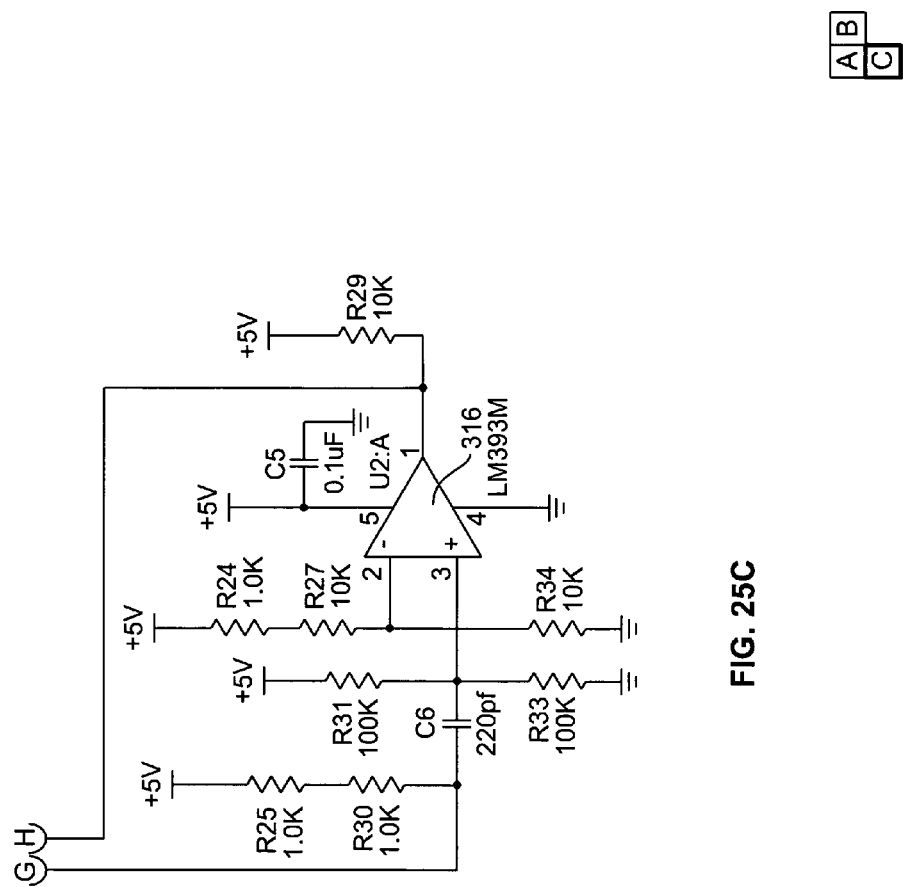

The controller for the self-cleaning litter box 200 is illustrated in FIG. 25 and generally identified with the reference numeral 310. The controller 310 includes a microprocessor 311, for example, and a model ATTINY26-SC. The controller 310 includes a motor drive circuit 312 which drives the drive motor 252 in a first direction during a forward stroke and a reverse direction during a return stroke. The motor controller 312 includes a plurality of transistors Q1, Q2, Q3, Q4, Q6, and Q7. In addition, the motor controller circuit 312 also includes a plurality of diodes D2, D3, D5, D6, resistors R7, R8, R10, R11, R13, R14, R15, R19, R20, R21, and capacitors C10 and C11. The transistors Q1, Q3 and Q7 control DC power to the motor in one direction while the transistors Q2, Q4 and Q6 control DC power to the drive motor 252 in a reverse direction. More particularly, the transistors Q1 and Q2 are normally open. At power-up, the signals; MOTOR_OUT_1, MOTOR_OUT_2, MOTOR_OUT_3 and MOTOR_OUT_4 are all low resulting in the drive transistors Q1-Q7 all being off. Also, the drive motor 252 may be stopped by causing the drive signals; MOTOR_OUT_1, MOTOR_OUT_2, MOTOR_OUT_3 and MOTOR_OUT_4 to go low.

The diodes D2, D3, D5, and D6 provide full wave rectification of the motor supply voltage HV_IN. In particular, the diodes D2, D3, D5, and D6 produce a +supply voltage at the node between the diodes D2 and D5 and 0 volts at the node between the diodes D3 and D6.

In a forward direction, the drive signals MOTOR_OUT_1 and MOTOR_OUT_4 go high. The high MOTOR_OUT_1 signal causes the transistor Q3 to close, which, in turn, causes the transistor Q1 to close. When the transistor Q1 switches closed, the supply voltage for the drive motor 252 is connected to a MOTOR_OUT_A terminal and 0 volts on a MOTOR_OUT_B terminal, which in turn are connected to the drive motor 252.

In a reverse direction, the signals MOTOR_OUT 2 and MOTOR_OUT_3 go high. The high MOTOR_OUT 2 signal causes the drive transistor Q4 to close, which in turn causes the drive transistor Q2 to close. This causes a positive supply voltage to be connected to the motor terminal MOTOR_OUT_B. by way of the transistor Q2. The high MOTOR_OUT_3 signal causes the drive transistor Q6 to close which connects 0 volts to the motor terminal MOTOR_A.

Irrespective of the direction of rotation of the drive motor 252, the motor drive current is sensed by a current sense circuit 312 which includes plurality of current sense resistors R35, R32, connected in parallel as shown. These current sense resistors are R35-R42 form a voltage divider with a resistor R23, which, in turn, is connected to an inverting input of a comparator 314. A reference voltage is applied to the non-inverting input of the comparator 314. The reference voltage is developed by a +5 volt DC source in a voltage divider formed from the resistors R28 and R29. A bypass capacitor C4 may be coupled to the inverting input of the comparator 314 to stabilize the output. The output of the comparator 314 is pulled high by way of a pull-up resistor R26. The output of the comparator 314 is normally high and is sensed by a PB6/INTO of the microprocessor 311. Whenever the motor drive current exceeds a predetermined value, for example, 550 milli-amps, the voltage applied to the inverting input will be high enough to trigger comparator 314, indicating a locked rotor condition for a predetermined time, indicative, for example, that the rake assembly 222 is stuck and the drive motor 252 is in a locked rotor condition, indicating a cat may be blocking the rake assembly 222. The trip set point of the comparator 314 is determined by the resistors R28 and R32. When the comparator 314 is triggered, its output goes low. This low signal CUR_LIM_IN is applied to the microprocessor 311 which shuts off whichever of the drive signals MOTOR_OUT_3 or MOTOR_OUT_4 that is high and re-enables the signal after, for example 250 microseconds. If a 550 milliampere condition persists for a predetermined time period, for example, 200 milliseconds, the drive motor 252 is assumed to be stalled and it is shut off.

The controller 310 also includes an infrared (IR) circuit detector, used to detect the presence of a cat in a self-cleaning litter box 200. The IR detector circuit includes an infrared diode (not shown), a photo-transistor(not shown)a transistor Q5, a pair of current limiting resistors R9 and R12, a comparator 316, a plurality of resistors R27, R34, R31, R33, R25, and R30. Power is constantly supplied to the infrared diode and photo-transistor by way of the five-volt power supply and a resistor R2 at a terminal IR_OUT_1 (pin 8 of the connector J1).

An infrared sensor control signal IR_LED_OUT is normally low. Periodically, this infrared sensor control signal IR_LED_OUT goes high, for example for 10 microseconds, to turn on the transistor Q5. This causes a relatively large current, for example >250 milliamps to flow through the IR diode(not shown) by way of the terminal IR_OUT_2. This causes the IR diode to flash, which, in turn, is detected by a photo-transistor (not shown) connected to pin 5 of the connector J1. The output of the photo-transistor is a pulse signal IR_SENSE_IN that is connected to a terminal 5 on a connector 317 and applied to a non-inverting input of a comparator 316. When the beam is not broken, indicating the absence of a cat, the non-inverting input is pulled low tripping the comparator 316 causing the comparator output 316 to go low. After the IR_SENSE_IN pulse passes (i.e. the photo-transistor is shut-off), the non-inverting input of the comparator 314 goes high which causes the voltage on the capacitor C6 to float back to its nominal level, resulting in the comparator 316 returning to a high state.

The microprocessor 311 continuously monitors the IR detector activity even while the drive motor 252 is running. If the microprocessor 311 continuously receives the IR_SENSE_IN pulses, then the system assumes that the beam is not broken. If no pulses are received, for example, 3 or more time periods, the beam is considered to be broken indicating that a cat is in the litter box.

There are also two other system inputs to the microcontroller 311. In particular, there are two limit switches, identified as an "end" limit switch at the waste end 232 and a "home" limit switch at the home position 224. These limit switch inputs are applied to pins 1 and 3 of the connector 37 and, in turn, to the microprocessor 311 ports PB3 and PB4/XTAL1. These inputs are pulled up by way of pull-up resistors R16 and R17. The limit switches are used to provide a signal to the microcontroller 311 to stop the drive motor 252 at the end of the forward cycle and to reverse its direction.

The system may also include an optional cycle switch S1 which allows the rake assembly 222 and drive assembly 218 to cycle through one cycle of operation. The cycle switch is coupled to a port PA1/ADC1 of the microcontroller 311. The cycle switch is pulled high by a pull-up resistor R1.

Power for the circuit is developed by a power supply 319. For example, a national semiconductor, model no. LM78M05CT. Bypass capacitors C10 and C11 can be used to optionally stabilize the power supply.

An LED 320 may be provided to indicate various states in the raking cycle as discussed below. The LED 320 is connected to a port PA2/ADC2 by way of a current-limiting resistor R12.

Figure 26:
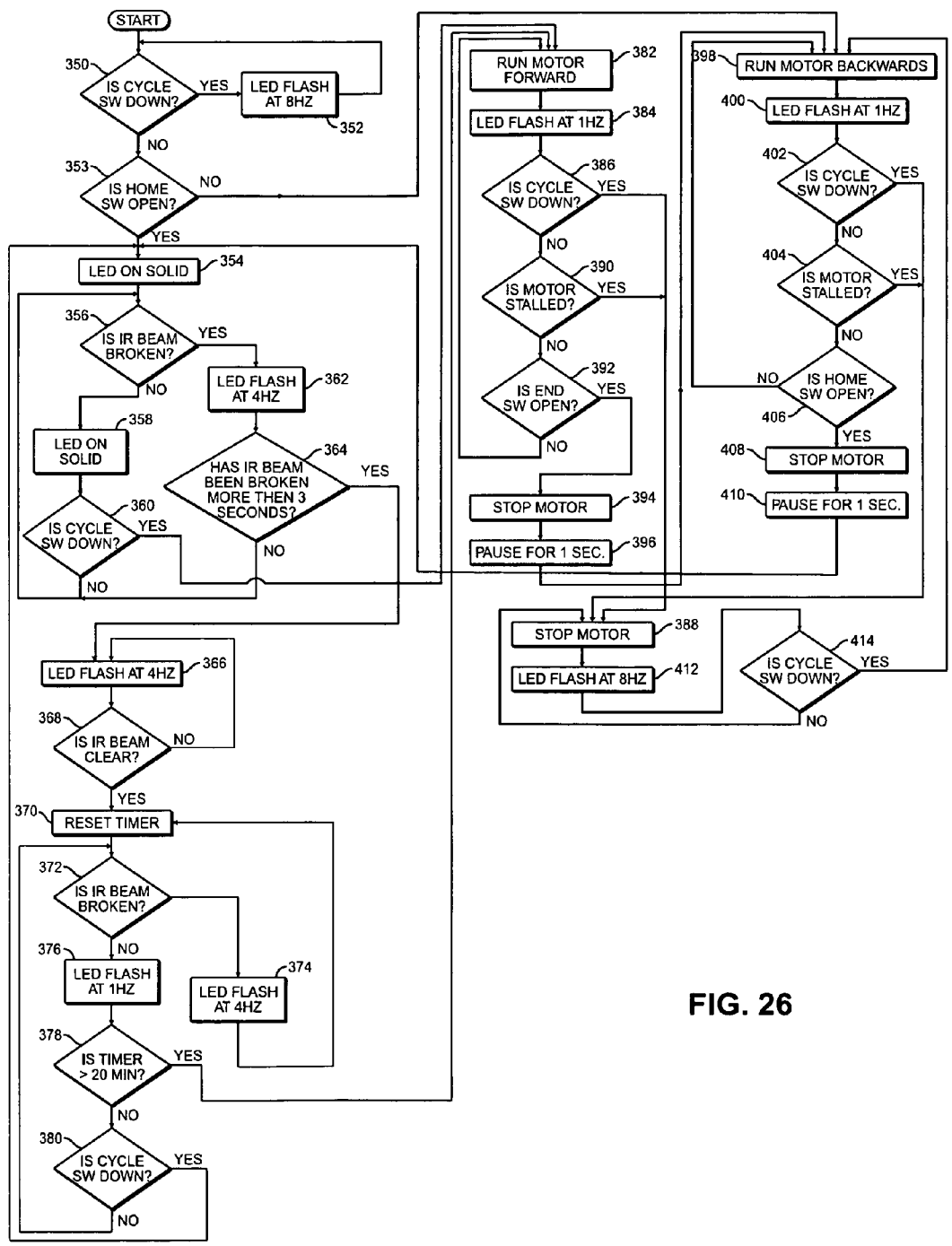
FIG. 26 is a logic diagram for the controller illustrated in FIG. 25.

The logic diagram for the controller 310 is illustrated in FIG. 26. Initially, the system checks initially in step 350 to determine whether the cycle switch S1 has been depressed. If so, the system flashes the LED 320 at 8 Hz in step 352 and cycles back to step 350. If the cycle switch S1 has not been depressed, the system next checks in step 353 to determine whether the "home" limit switch is open, indicating that the nut follower 264 has reached the home position 224. If so, the LED 320 is turned on solid in step 354. The system next checks in step 356 to determine whether the infrared beam is broken. If not, the LED 320 is turned on solid in step 358 and the system proceeds to step 360 to determine if the cycle switch S1 has been depressed. If the cycle switch S1 has not been depressed, the system loops back to step 356. If the cycle switch has been pressed, the system initiates a cycle as discussed below. If the infrared beam has been broken, the LED 320 is flashed at a second flashing rate in step 362. The system then measures the time since the infrared beam has been broken in step 364. If less than three seconds have elapsed, the system loops back to step 356. If more than three seconds have elapsed, the system proceeds to step 366 and flashes the LED 320 at 4 Hz. The system then checks in step 368 to determine if the infrared beam is clear, if not, it loops back to step 366 and continues flashing the LED 320 at 4 Hz. If the infrared beam is clear, the system resets the timer in step 370 and proceeds to step 372 to check again if the infrared beam has been broken. If so, the LED 320 is flashed at a rate of 4 Hz in step 374 and the system loops back to step 370. If the infrared beam has not been broken, as determined in step 372, the system flashes the LED at 1 Hz in step 376. The system then checks the timer to see whether more than a predetermined time period, such as 20 minutes have elapsed in step 378. If so, the system initiates a cleaning cycle as will be discussed below. If not, the system proceeds to step 380 and checks whether the cycle switch S1 has been depressed. If so, the system loops back to step 354. If the cycle switch S1 has not been depressed, the system loops back to step 372.

Any time a cleaning cycle is initiated, the microprocessor 311 runs the driver motor 252 in a forward direction by generating the signal's MOTOR_OUT1 or MOTOR_OUT_2 to close the transistor Q1 or Q7 in step 382. After the drive motor 252 is driven forward in step 382, the LED 320 is flashed at a 1 Hz rate in step 384. The system next checks in step 386 to determine whether the cycle switch S1 is down. If so, the system exits the cleaning cycle and proceeds to step 388 and stops the motor. If the cycle switch S1 has not been depressed, the system next checks in step 390 to determine if a stalled motor condition has occurred as discussed above. If so, the system stops the motor in step 388. If a stalled motor condition is not detected in step 390, the system checks in step 392 to determine whether the waste end limit switch is open indicating that the drive assembly 218 and rake assembly 222 has arrived at the end of the forward stroke. If not, the system continues running the loops back to step 382 and continues running the drive motor 252. If the waste end limit switch is open, the system stops the motor in step 394 and pauses for a predetermined time period, for example, one second and 396. Subsequently, the system reverses directions of the drive motor 252 by causing the appropriate MOTOR_OUT_1 and MOTOR_OUT_3 to go low and the signals MOTOR_OUT_2 and MOTOR_OUT_4 to go high. As discussed above, this causes the transistors Q2 and Q6 to close, which reverses the direction of the drive motor 252 in step 398. After the drive, motor 252 is being driven in a reverse direction (i.e., in a return stroke), the LED 320 is flashed at a 1 Hz rate in step 400. The system then checks in step 402 to determine whether the cycle switch S1 has been depressed. If so, the system stops the motor in step 388. If the system determines that the cycle switch S1 is not down in step 402, a stalled motor condition is checked in step 404. If a stalled motor condition is detected in step 404, as discussed above, the drive motor 252 is stopped in step 388. If no stop motor condition is detected in step 404, the system checks in step 406 to determine whether the "home" limit switch is open. Indicating that the drive assembly 218 and rake assembly 222 has returned to the home position 224. If not, the system loops back to step 398 and continues running the drive motor 252 in a reverse direction. If the home limit switch is open, the motor is stopped in step 408 and the system pauses for a predetermined time period, for example, one second in 410. The system then loops back to step 354.

After the motor is stopped in step 388, the LED 320 is flashed at an 8 Hz rate in step 412. Subsequently, the system checks to determine whether the cycle switch S! is down in step 414. If not, the system loops back to step 388. If so, the system loops back to step 398 and cycles the drive motor 252 in a reverse direction.

The signals IPS_MOSI, ISP_RST, ISP_SCK, and ISP_MISO may be used to initially program the controller 310. These signals IPS_MOSI, ISP_RST, ISP_SCK, and ISP_MISO are external programming signals applied to a connector JP1 and pulled high by a plurality of pull-up resistors R3, R4, R5 and R6 and applied to ports P01, P02, P03 and P04, respectively, of the microcontroller 311. The connector JP1 as well as the pull-up resistors R3, R4, R5 and R6 are only required for initial programming of the controller 310 and are not required for commercial embodiments since the system will be pre-programmed. Obviously, many modifications and variations of the present invention are possible in light of the above teachings. Thus, it is to be understood that, within the scope of the appended claims, the invention may be practiced otherwise than as specifically described above.

We claim:

1. A self-cleaning litter box, the self-cleaning litter box comprising:
   a housing;
   a rake assembly movably connected to the housing;
   a frame attached to the rake assembly for carrying a plurality of spaced apart tines each having a top and bottom, said tines configured as flexible members and are at all times angled backward from bottom to top with respect to the rake direction of travel.

2. The rake assembly as recited in claim 1, wherein said tines are formed from metal.

3. The rake assembly as recited in claim 2, wherein said tines are configured in a loop.

4. The rake assembly as recited in claim 1, wherein each pair of tines comprise a U-shaped length of material.

5. A self-cleaning litter box machine in combination with a removable litter cartridge: comprising:
   a crystal litter for use within the litter cartridge;
   a housing assembly with an open bottom for receiving the removable litter cartridge;
   a rake assembly which includes a rake for combing through the crystal litter within said litter cartridge during a cleaning stroke from a home position to a waste position for raking a waste to said waste position during a cleaning stroke and thereafter during a return stroke returning to said home position;
a drive assembly mounted within the housing assembly for driving said rake assembly; and
a chassis assembly for carrying said rake assembly and said drive assembly, said drive assembly and said chassis assembly being carried by said housing assembly, wherein the removable litter box machine lifts substantially vertically off of said removable litter cartridge.

6. The self-cleaning litter box as recited in claim 5, wherein said removable litter cartridge includes a pivotally mounted cover adjacent one end and said chassis assembly is configured to lift said pivotally mounted cover as said rake approaches said waste position and is further configured to enable said cover to lower as said rake moves away from said waste position.

7. The self-cleaning litter box as recited in claim, 5, wherein said rake assembly includes a pivotable wire frame that defines a pivot axis and a plurality of tines coupled to said wire frame and wherein said litter box assembly is configured to carry said rake assembly so that the vertical height of said pivot axis is constant during a cleaning stroke.

8. The self-cleaning litter box as recited in claim 5, wherein said rake assembly includes a plurality of tines and said tines are elevated relative to said litter cartridge at said home end.

9. The self-cleaning litter box as recited in claim 5, wherein said rake assembly is lowered into the crystal litter and remains at a constant height within the litter as said rake assembly moves away from said home end to collect waste within the litter.

10. The self-cleaning litter box as recited in claim 5, wherein said chassis assembly is configured to carry said rake assembly so that the vertical height of said rake assembly remains constant while engaged within the litter during a cleaning stroke as said rake assembly is moved from said home end to said waste end.

11. The self-cleaning litter box as recited in claim 10, wherein said rake assembly includes a plurality of generally coplanar tines and said chassis assembly and said rake assembly are configured to enable said plurality of generally coplanar tines to tilt in a forward angle relative to a vertical plane while combing the litter.

12. The self-cleaning litter box as recited in claim 10, wherein said chassis assembly and said rake assembly are configured to enable said plurality of generally coplanar tines to tilt forward relative to a vertical plane without lateral movement.

13. A self cleaning litter box assembly for automatically cleaning a removable litter cartridge containing litter, the self-cleaning box assembly comprising:
a housing assembly with an open bottom for receiving a removable litter cartridge
a rake assembly which includes a rake with a plurality of tines each having a top and bottom, said rake configured to be received in said removable litter cartridge when said removable litter cartridge is received in said housing assembly and said rake is configured to comb through said litter cartridge for removing cat waste during a cleaning stroke as the rake moves from a home position for moving waste to a waste position at one end of the removable litter cartridge and to return to said home position during a return stroke, wherein the bottom of said tines remain at a constant predetermined height throughout combing of the litter and a transition between a waste receiving area to a waste storage area;
a drive assembly for driving said rake assembly; and
a chassis assembly for carrying said rake assembly, said chassis configured to carry said rake assembly over said removable litter cartridge.

14. The self-cleaning litter box assembly as recited in claim 13, wherein said self-cleaning litter box assembly is configured to enable it to be lifted vertically to remove said removable litter cartridge.

15. The self-cleaning litter box assembly as recited in claim 13, wherein said housing assembly includes a pivotally mounted lid at one end to cover the waste position during cat use of the litter box assembly and said chassis assembly includes a lid lifting mechanism for lifting said lid during the cleaning stroke to deposit said waste.

16. The self-cleaning litter box assembly as recited in claim 15, wherein said removable cartridge includes a pivotally mounted cover at one end and said lid and said cover are configured such that lifting said lid by said lid lifting mechanism causes said cover on said removable litter cartridge to be lifted by magnetic forces.

17. The self-cleaning litter box assembly as recited in claim 13, wherein said rake includes a wire frame to which said tines are secured forming a rake assembly.

18. The self-cleaning litter box assembly as recited in claim 17, wherein said rake assembly is pivotal about a pivot axis defined by said wire frame.

19. The self-cleaning litter box assembly as recited in claim 17, wherein said rake assembly is mounted so that it is tilted forward in the direction of movement with respect to a vertical axis during a cleaning stroke.

20. The self-cleaning litter box assembly as recited in claim 13, wherein each pair of said tines are configured in a U-shape.

21. The self-cleaning box assembly as recited in claim 13, wherein each tine is configured from steel wire.

22. The self-cleaning litter box assembly as recited in claim 13, wherein said drive assembly includes a single drive motor and mechanism coupled thereto and coupled to said rake assembly for causing linear movement of said rake assembly relative to said chassis assembly.

23. The self-cleaning litter box assembly as recited in claim 22, wherein said mechanism includes at least one lead screw.

24. The self-cleaning litter box assembly as recited in claim 22, wherein said chassis assembly and said rake assembly are configured so that said drive motor also causes rotation of said rake about a predetermined pivot point.

25. The self-cleaning litter box assembly as recited in claim 24, wherein said predetermined pivot point includes at least one stop configured in said chassis assembly.

26. The self-cleaning litter box assembly as recited in claim 25, wherein a waste area is disposed adjacent to said one end and translation of said rake causes any collected waste during a cleaning stroke to be disposed into said waste area.

27. The self-cleaning litter box assembly as recited in claim 13 wherein said rake is configured with a wire frame and a plurality of tines connected thereto on one end, the spacing of said tines along said wire frame being selected to be larger than the particle size of the litter to be used in the separate litter cartridge.

28. The self-cleaning litter box assembly as recited in claim 27, wherein the spacing between adjacent tines is selected to be 3-20 millimeters.

29. The self-cleaning litter box assembly as recited in claim 13, wherein said rake assembly includes a plurality of tines and wherein the chassis assembly and said rake assembly are configured so that the bottom of the tines is below the normal litter level in said home position.

30. The self-cleaning litter box assembly as recited in claim 13, wherein said chassis assembly and said drive assembly are configured as a labyrinth seal to prevent litter from entering said drive assembly.

31. A self cleaning litter box assembly for automatically cleaning a removable litter cartridge containing litter, the self-cleaning litter box assembly comprising:
   a housing assembly configured to receive a removable litter cartridge;
   a rake assembly which includes a rake with a plurality of tines each having a top and bottom, said rake configured to be received in said removable litter cartridge and disposed over said removable litter cartridge and comb through said removable litter cartridge during a cleaning stroke from a home position and move waste to a waste position of said removable litter cartridge and to return to said home position during a return stroke;
   a drive assembly, carried by said housing assembly, said drive assembly including a drive motor for driving said rake assembly, said rake assembly configured to enable said rake to pivot to a first predetermined angle relative to a vertical axis during a cleaning stroke under the influence of said drive motor such that the tines are angled backward from the bottom to the top by a substantial angle with respect to the rake direction of travel; and
   a chassis assembly, carried by said housing assembly, said chassis assembly for carrying said rake assembly, said chassis assembly configured to carry said rake assembly over said removable litter cartridge.

32. The self-cleaning litter box assembly as recited in claim 31, wherein said rake assembly is configured to enable said rake to pivot a second predetermined angle relative to a vertical axis during a return stroke under the influence of said drive motor.

33. The self-cleaning litter box assembly as recited in claim 32, wherein the magnitude of said first and second predetermined angles are equal.

34. The self-cleaning litter box assembly as recited in claim 32, wherein at least one of said first predetermined angle and said second predetermined angle is in the range of 10° to 60° with 45° being the preferred.

35. A self cleaning litter box assembly for automatically cleaning a removable litter cartridge containing litter, the self-cleaning litter box assembly comprising:
   a housing assembly configured to receive a removable or separate litter cartridge;
   a rake assembly which includes a rake with a plurality of tines each having a top and bottom, said rake configured to be received in said separate litter cartridge and disposed over said separate litter cartridge and comb through said litter cartridge during a cleaning stroke from a home position and move waste to a waste position in said separate litter cartridge and to return to said home position during a return stroke;
   a drive assembly including a drive motor for driving said rake assembly, said drive assembly carried by said housing assembly and further configured to enable said rake to pivot to a first predetermined angle relative to a vertical axis to an angled position and to travel during a cleaning stroke at said angled position under the influence of said drive motor such that the tines are angled backward from the bottom to the top by a substantial angle with respect to the rake direction of travel; and
   a chassis assembly for carrying said rake assembly, said chassis assembly configured to carry said rake assembly over said removable litter cartridge, wherein said rake assembly and said drive assembly are configured so that said rake rotates at said waste position under the influence of said drive motor during a return stroke.

36. A self cleaning litter box assembly as recited in claim 35, wherein said rake assembly and said drive assembly are configured so that said rake rotates a sufficient amount to dump any collected waste into a waste compartment disposed adjacent said waste position.

37. A self cleaning litter box assembly for automatically cleaning a removable litter cartridge containing litter, the self-cleaning box assembly comprising:
   a removable litter cartridge;
   a side rail assembly including two spaced apart side rails that are adapted to rest on a generally flat surface and configured to receive said removable litter cartridge therebetween;
   a rake assembly which includes a rake with a plurality of tines, said rake assembly carried by said spaced apart side rails and configured to be received in said removable litter cartridge and comb through said removable litter cartridge during a cleaning stroke from a home position and move waste to a waste area of said removable litter cartridge and to return to said home position during a return stroke; and
   a drive assembly for driving said rake assembly from an initial home position to a waste position during a forward stroke and back to a home position during a return stroke, wherein said side rails are spaced apart to enable said self-cleaning litter box to lift vertically off of the removable litter cartridge to enable said cartridge to be removed.

38. The self-cleaning litter box as recited in claim 37, wherein said removable cartridge is configured with a hinged lid on one end for covering waste.

39. The self-cleaning litter box as recited in claim 38, further including a mechanism for lifting said hinged lid during a forward stroke and enabling said hinged lid to return to a closed position during a return stroke.

40. The self-cleaning litter box as recited in claim 37, wherein said self-cleaning litter box is configured so that said rake assembly does not change the vertical position during a forward and return stroke.

41. The self-cleaning litter box as recited in claim 37, wherein said rake is rotatably mounted.

42. The self-cleaning litter box as recited in claim 41, further including a mechanism for causing said rake to rotate without horizontal translation at said home position.

43. The self-cleaning litter box as recited in claim 37, further including a top housing for protecting said side rails and said drive assembly from contamination.

44. The self-cleaning litter box as recited in claim 43, wherein said top housing forms a labyrinth seal but allows translation of said rake assembly.

45. The self-cleaning litter box as recited in claim 37, wherein said removable litter cartridge includes a hinged flap on one end for covering waste in said waste area.

46. The self-cleaning litter box as recited in claim 37, wherein said self-cleaning litter box is configured to stand on end.

47. A method for treating waste in a kitty litter box comprising the steps of
   (a) providing a removable litter tray;
   (b) providing a crystal litter in the removable litter tray
   (c) providing a cover over a portion of the crystal litter thereof defining a waste area, wherein said removable litter tray is non-compartmentalized;

(d) configuring said kitty litter box to automatically move waste to said waste area; and (e) configuring said kitty litter box to automatically cover the crystal litter with waste within said waste area; and (f) lifting the kitty litter box vertically off of said litter tray in order to dispose of said waste.

48. A self cleaning litter box in combination with a litter cartridge having a litter compartment and a separate waste compartment, the self cleaning litter box comprising:

a housing assembly;

a rake assembly including a plurality of tines each having a top and bottom coupled to a frame for combing through said litter compartment; and a chassis assembly, carried by said housing assembly, said chassis assembly for carrying said rake assembly, a drive assembly, carried by said housing assembly, for driving said chassis assembly during a cleaning stroke from a home position to a waste position during a cleaning stroke and returning to said home position during a return stroke;

a waste cover pivotally mounted to said housing assembly, adjacent said waste compartment, a lifting arm assembly configured to lift said waste cover as said rake assembly approaches the waste position to enable waste to be deposited in the waste compartment and allow said cover to close as said rake assembly moves toward said home position; and wherein the bottom of said tines remain at a constant predetermined height throughout combing of the litter and a transition between a waste receiving area to a waste storage area.

49. A self cleaning litter box having a litter tray therein, the self cleaning litter box comprising:

a housing assembly;

a rake assembly including a plurality of tines for combing through said entire litter tray at a constant height to collect cat waste therein;

a chassis assembly for carrying said rake assembly; and a drive assembly, carried by said chassis assembly, for driving said rake assembly during a cleaning stroke from a home position to a waste position during a cleaning stroke and returning to said home position during a return stroke, wherein said drive assembly includes an electric motor having at least one drive shaft, said electric motor being mounted to said chassis assembly, said housing assembly defining a labyrinth seal for surrounding said chassis and drive assemblies for protecting all drive elements from contamination by litter of waste.

50. The self-cleaning litter box as recited in claim 49, wherein said electric motor is reversible.

51. The self-cleaning litter box as recited in claim 50, further including a first limit switch having at least two states, disposed adjacent waste position, said first limit switch disposed to change states when said chassis assembly reaches said waste position.

52. The self-cleaning litter box as recited in claim 50, wherein said drive assembly includes a controller, said controller configured to cause said electric motor to reverse directions when said first limit switch changes states due to said chassis assembly reaching said waste position.

53. The self-cleaning litter box as recited in claim 52, further including a second limit switch having at least two states, disposed adjacent home position, said second limit switch disposed to change states when said chassis assembly reaches said home position.

54. The self-cleaning litter box as recited in claim 53, wherein said controller is configured to cause said electric motor to reverse directions when said second limit switch changes states due to said chassis assembly reaching said home position.

55. The self-cleaning litter box assembly as recited in claim 49, wherein said electric motor is mounted such that said drive shaft is generally perpendicular to the direction of travel of said chassis assembly.

56. The self cleaning litter box as recited in claim 55, wherein said drive assembly includes at least one lead screw assembly, said lead screw assembly coupled to said drive shaft and said chassis assembly for driving said chassis assembly from said home position to said waste position during a cleaning stroke and from a waste position to a home position during a return stroke.

57. The self cleaning litter box as recited in claim 56, wherein said drive assembly includes a worm gear assembly mechanically coupled between said drive shaft and said lead screw assembly for coupling the output power from said drive shaft to said lead screw assembly.

58. A litter box in combination with a removable litter tray having a housing with at least two sidewalls joined to a rear wall, an opening in a top and a bottom of the housing, said bottom opening of the housing fitting over the removable litter tray, said tray having four vertical sidewalls rigidly connected to each other to form a generally rectangular litter tray having a top edge and said housing having an interior ledge slanted downwardly over the top edge of the tray and surrounding an outer perimeter of the tray for directing animal waste, scattered litter and urine into the tray without any mechanical coupling thereto to facilitate removal and reinsertion of the litter tray by simply lifting the housing vertically upwardly off the litter tray.

59. A method for handling cat litter box machine in combination with a removable litter cartridge comprising the steps of:

placing a new litter cartridge filled with crystal cat litter on a floor;

installing the new cartridge within a litter box machine by lowering the machine vertically downward on said cartridge;

automatically raking cat waste to one end of the cartridge for storage under a lid;

lifting the litter box machine vertically off the cartridge;

disposing of the cartridge containing both used litter and stored waste; and replacing the disposed cartridge with a new cartridge filled with crystal cat litter therein.

60. A method for changing a spent removable litter cartridge used in an open bottomed, unattached litter box machine comprising the steps of:

lifting the unattached litter box machine substantially vertically off of the spent litter cartridge located on a floor;

standing the litter box on an end;

removing the spent cartridge;

locating a new cartridge near the litter box standing on end; and lowering the litter box onto the new cartridge such that the litter box and new cartridge rest approximately on said floor.

* * * * *